US012023587B2

(12) United States Patent
Abe

(10) Patent No.: US 12,023,587 B2
(45) Date of Patent: Jul. 2, 2024

(54) STORAGE MEDIUM, INFORMATION PROCESSING SYSTEM, INFORMATION PROCESSING APPARATUS, AND GAME PROCESSING METHOD

(71) Applicant: Nintendo Co., Ltd., Kyoto (JP)

(72) Inventor: Goro Abe, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 0 days.

(21) Appl. No.: 17/404,559

(22) Filed: Aug. 17, 2021

(65) Prior Publication Data

US 2022/0152502 A1 May 19, 2022

(30) Foreign Application Priority Data

Nov. 19, 2020 (JP) .................................. 2020-192537
Nov. 19, 2020 (JP) .................................. 2020-192538

(51) Int. Cl.
*A63F 13/56* (2014.01)
*A63F 13/58* (2014.01)
*A63F 13/837* (2014.01)

(52) U.S. Cl.
CPC .............. *A63F 13/56* (2014.09); *A63F 13/58* (2014.09); *A63F 13/837* (2014.09)

(58) Field of Classification Search
CPC ......... A63F 13/837; A63F 13/58; A63F 13/56
See application file for complete search history.

(56) References Cited

U.S. PATENT DOCUMENTS

| 5,498,002 | A | * | 3/1996 | Gechter | .................. | A63F 13/60 |
| | | | | | | 463/31 |
| 5,970,479 | A | | 10/1999 | Shepherd | | |
| 6,755,743 | B1 | * | 6/2004 | Yamashita | ............ | A63F 13/833 |
| | | | | | | 463/40 |

(Continued)

FOREIGN PATENT DOCUMENTS

| JP | 2000342855 A | 12/2000 |
| JP | 2002085845 A | 3/2002 |

(Continued)

OTHER PUBLICATIONS

"WarioWare Gold", online, Nintendo Co., Ltd., searched on Sep. 29, 2020, internet <https://www.nintendo.com/games/detail/warioware-gold-3ds>, printed Aug. 17, 2021.

(Continued)

*Primary Examiner* — Thomas H Henry
(74) *Attorney, Agent, or Firm* — Scully, Scott, Murphy & Presser, P.C.

(57) ABSTRACT

An example of an information processing system automatically determines a play target game to be played by a player, from among a plurality of types of games. The information processing system automatically determines a usage character to be operated by the player, from among a plurality of characters whose operation methods are different from each other. The information processing system executes the play target game by controlling the determined usage character in a virtual space, based on an operation performed by the player, and advances the game based on whether or not a clear condition for the play target game has been satisfied within a time limit.

34 Claims, 17 Drawing Sheets

(56) References Cited

U.S. PATENT DOCUMENTS

| | | |
|---|---|---|
| 7,818,399 B1 | 10/2010 | Ross, Jr. et al. |
| 9,498,705 B2 | 11/2016 | May et al. |
| 10,918,944 B2 | 2/2021 | Suzuki et al. |
| 10,981,057 B2 | 4/2021 | Hirose et al. |
| 11,020,675 B2 | 6/2021 | Suzuki et al. |
| 11,173,403 B2 | 11/2021 | Sakurai |
| 2004/0166937 A1* | 8/2004 | Rothschild ............ G07F 17/32 463/36 |
| 2007/0270219 A1* | 11/2007 | Sugioka ............... G06F 3/0346 463/37 |
| 2014/0171201 A1 | 6/2014 | May et al. |
| 2019/0070502 A1* | 3/2019 | Hirose ................... A63F 13/45 |
| 2019/0299099 A1 | 10/2019 | Oshino et al. |
| 2019/0366211 A1 | 12/2019 | Suzuki et al. |
| 2019/0366221 A1 | 12/2019 | Suzuki et al. |
| 2020/0114267 A1 | 4/2020 | Sakurai |
| 2020/0230496 A1 | 7/2020 | Hayashi et al. |
| 2021/0205706 A1 | 7/2021 | Lutz |
| 2022/0152502 A1 | 5/2022 | Abe |
| 2023/0191255 A1 | 6/2023 | Iwao |

FOREIGN PATENT DOCUMENTS

| | | | |
|---|---|---|---|
| JP | 2010119519 A | 6/2010 | |
| JP | 2012081154 A | 4/2012 | |
| JP | 2014121487 A | 7/2014 | |
| JP | 2019097583 A | 6/2019 | |
| JP | 2019171013 A | 10/2019 | |
| JP | 2020116040 A | 8/2020 | |

OTHER PUBLICATIONS

U.S. Appl. No. 17/404,567, filed Aug. 17, 2021.
Notice of Reasons for Refusal dated Nov. 17, 2023 received in Japanese Patent Application No. JP 2020-192537.
"Zelda Musou", Weekly Famitsu Special Issue, Kadokawa Corporation, Jun. 26, 2014, pp. 212-215, vol. 29, No. 28.
"Vigilante 8", Weekly Famitsu, ASCII, Nov. 27, 1998, p. 120, vol. 13, No. 48.
Notice of Reasons for Refusal dated Nov. 17, 2023 received in Japanese Patent Application No. JP 2020-192538.
Notice of Reasons for Refusal dated Mar. 1, 2024 received in Japanese Patent Application No. JP 2020-192538.
"Final Fantasy Crystal Chronicles Echoes of Time Perfect Guide", 1st edition, ENTERBRAIN Inc., Mar. 10, 2009, p. 198, ISBN:978-4-7577-4753-1.
Notice of Reasons for Refusal dated Mar. 15, 2024 received in Japanese Patent Application No. JP 2020-192537.
Matsuura, K et al., "Action Game Algorithm Maniacs", first edition, SB Creative Corp., May 30, 2007, pp. 406 and 413, ISBN:978-4-7973-3895-9.

* cited by examiner

STORAGE MEDIUM, INFORMATION PROCESSING SYSTEM, INFORMATION PROCESSING APPARATUS, AND GAME PROCESSING METHOD

CROSS REFERENCE TO RELATED APPLICATION

This application claims priority to Japanese Patent Applications No. 2020-192537 and No. 2020-192538, filed on Nov. 19, 2020, the entire contents of which are incorporated herein by reference.

FIELD

The technique shown here relates to a storage medium, an information processing system, an information processing apparatus, and a game processing method which enable a player to perform a plurality of types of games.

BACKGROUND AND SUMMARY

Conventionally, there is a game program which enables a player to perform a plurality of types of games having different operation methods.

Regarding such games, there is room for improvement in increasing the variations of game contents.

Therefore, the present application discloses a storage medium, an information processing system, an information processing apparatus, and a game processing method capable of increasing the variations of game contents of a plurality of types of games.

(1) An example of a non-transitory computer-readable storage medium stores a game program. The game program causes a processor of an information processing apparatus to execute: automatically determining a play target game to be played by a player, from among a plurality of types of games; automatically determining a usage character to be operated by the player, from among a plurality of characters whose operation methods are different from each other; and executing the play target game by controlling the determined usage character in a virtual space, based on an operation performed by the player, and advancing the game based on whether or not a clear condition for the play target game has been satisfied within a time limit.

According to the configuration of the above (1), it is possible to provide games as many as the number of combinations of play target games and usage characters, thereby increasing the variations of game contents.

(2) The game program may cause the processor to execute: automatically determining a plurality of play target games; automatically determining a plurality of usage characters to be operated by the player in the respective play target games determined; and successively executing the plurality of play target games determined, thereby advancing a game including the plurality of play target games.

According to the configuration of the above (2), it is possible to provide a highly entertaining game in which the player successively plays the plurality of play target games while he/she cannot predict the contents and the usage characters of the games.

(3) The game program may cause the processor to execute determining the usage character at random from among the plurality of characters.

According to the configuration of the above (3), it is possible to make it difficult for the player to predict the usage character.

(4) The game program may cause the processor to execute automatically determining the usage character from among a plurality of candidate characters that have been designated in advance based on an instruction of the player.

According to the configuration of the above (4), since the player is allowed to select the candidate characters, the strategic characteristics of the game can be enhanced.

(5) The plurality of characters may be different from each other in a movement method according a direction input and a predetermined instruction input different from the direction input. The game program may cause the processor to further execute performing, during execution of the play target game, a movement control for the usage character in the virtual space, according to a movement method corresponding to the usage character, based on the direction input and the instruction input.

According to the configuration of the above (5), since the usage character to be used in the play target game varies, the fun factor of the play target game can be greatly varied. Thus, the variations of games made by combinations of usage characters and play target games can be increased.

(6) The game program may cause the processor to execute performing, as a movement control for at least any of the plurality of characters, a movement control by using at least any of: a method of moving the usage character in a direction according to the direction input; a method of moving the usage character in a predetermined direction according to a combination of the direction input and the instruction input; and a method of automatically moving the usage character.

(7) The game program may cause the processor to further execute performing, as a control for an attack motion of at least any of the plurality of characters, a control for an attack motion of shooting an attack object automatically or according to the instruction input.

According to the configuration of the above (7), the variations of the motions of the usage characters can be increased, thereby increasing the variations of games made by combinations of usage characters and play target games.

(8) The game program may cause the processor to further execute: performing, for each of the plurality of characters, a control of causing a predetermined object in the virtual space to generate a predetermined effect when the character has come into contact with the predetermined object; and performing, for a character that shoots the attack object among the plurality of characters, a control of causing the predetermined object to generate an effect when the attack object has come into contact with the predetermined object, the effect being the same as the effect generated when the character has come into contact with the predetermined object.

According to the configuration of the above (8), it is possible to avoid an inconvenient situation that the play target game cannot be cleared by a character incapable of shooting an attack object.

(9) The game program may cause the processor to execute, when the determined usage character is a predetermined character that shoots the attack object, starting the play target game by using the virtual space in which an object for movement is disposed, and performing a movement control for moving the predetermined character toward the object for movement when the attack object has come into contact with the object for movement.

According to the configuration of the above (9), the usage character, which performs a movement method different from a movement method in which a character moves in response to a direction input, is provided, thereby increasing the variations of games made by combinations of usage characters and play target games.

(10) The plurality of characters may include a character of a first type that is influenced by gravity in the virtual space, and a character of a second type that is not influenced by gravity in the virtual space. The game program may cause the processor to execute, when the usage character is the character of the first type, performing a movement control for the usage character with an influence of gravity being reflected during execution of the play target game.

According to the configuration of the above (10), the usage characters with which the player has different operation feelings are provided, thereby increasing the variations of games made by combinations of usage characters and play target games.

(11) The game program may cause the processor to further execute presenting, to the player, information regarding the determined play target game and the usage character, within a predetermined time period before the determined play target game is started.

According to the configuration of the above (11), it is possible to allow the player to confirm the play target game and the usage character to be used therein before the play target game is started.

(12) The game program may cause the processor to further execute, within the predetermined time period, presenting, to the player, an operation method for the determined usage character, and controlling the usage character, based on an operation by the player.

According to the configuration of the above (12), since the time period during which the player can operate the usage character is provided, it is possible to give the player an opportunity of operating the usage character, without decreasing the fun of the play target game to be executed thereafter.

(13) The time limit may be a time period, having a predetermined time length within 5 seconds, which is set for each of the plurality of types of games.

According to the configuration of the above (13), since the time limit is set to a reasonably short time, the player is required to quickly understand the operation method for the usage character and clear the play target game within the time limit, thereby enhancing the entertainment characteristics of the game.

This specification discloses examples of an information processing apparatus and an information processing system which execute the processes in the above (1) to (13). This specification also discloses an example of a game processing method for executing the processes in the above (1) to (13).

According to the storage medium, the information processing apparatus, the information processing system, and the game processing method, it is possible to increase the variations of game contents of a plurality of types of games.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
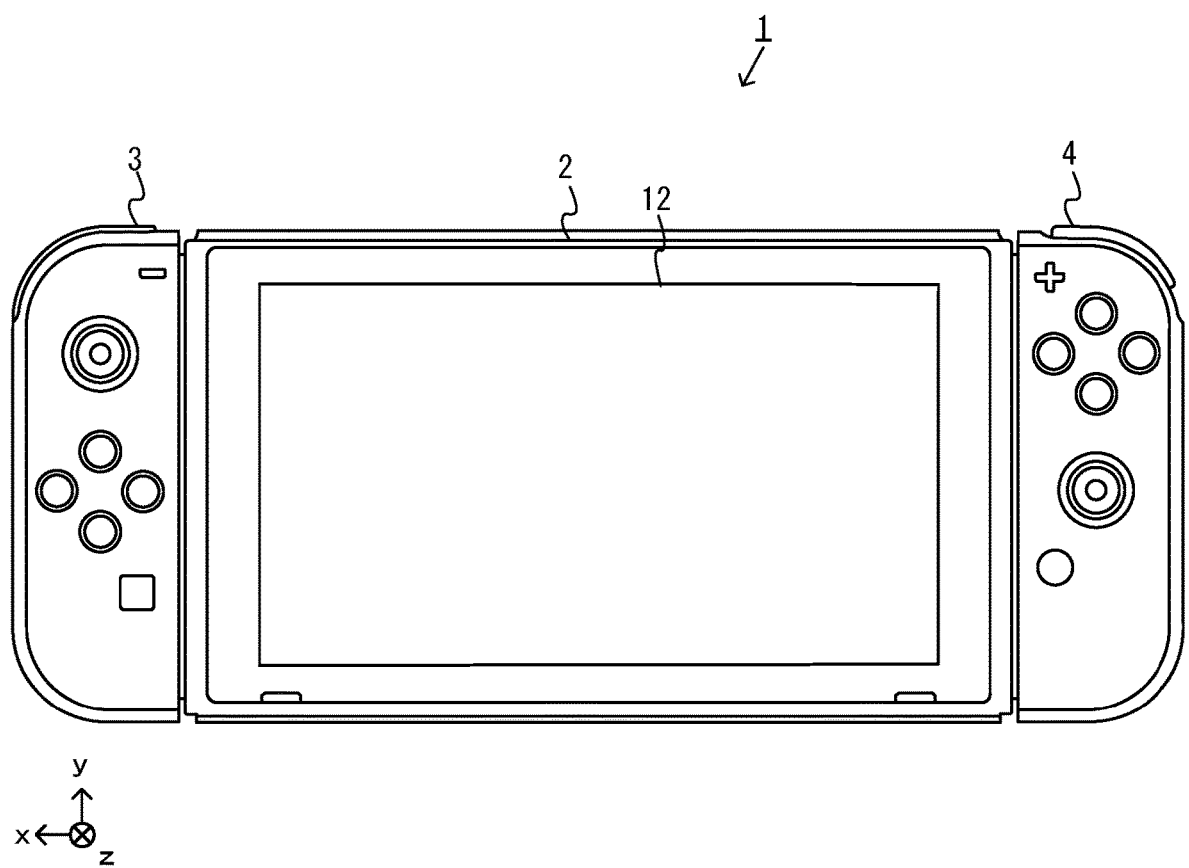
FIG. 1 is a diagram showing an example of a state where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
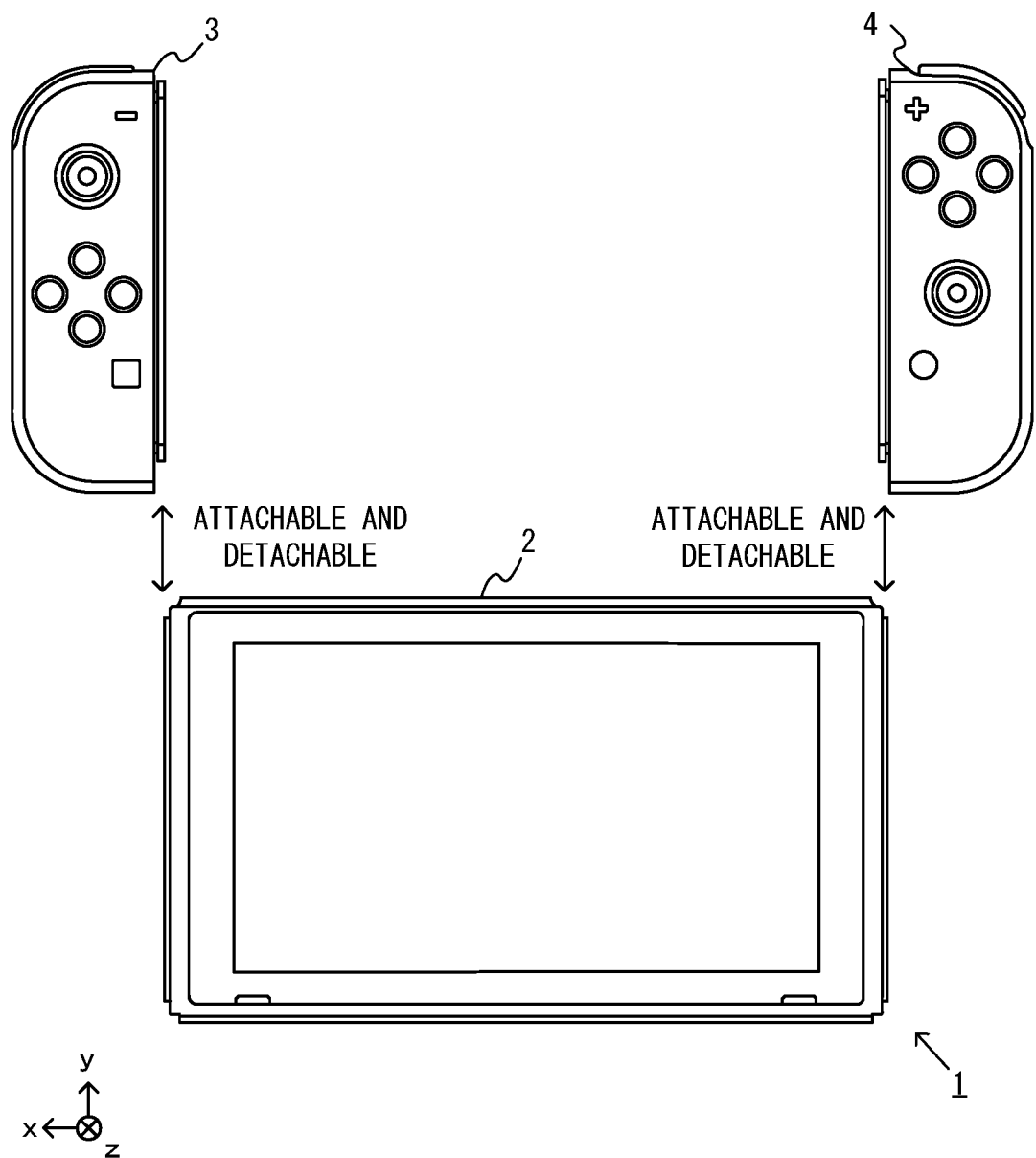
FIG. 2 is a diagram showing an example of a state where each of a non-limiting left controller and a non-limiting right controller is detached from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
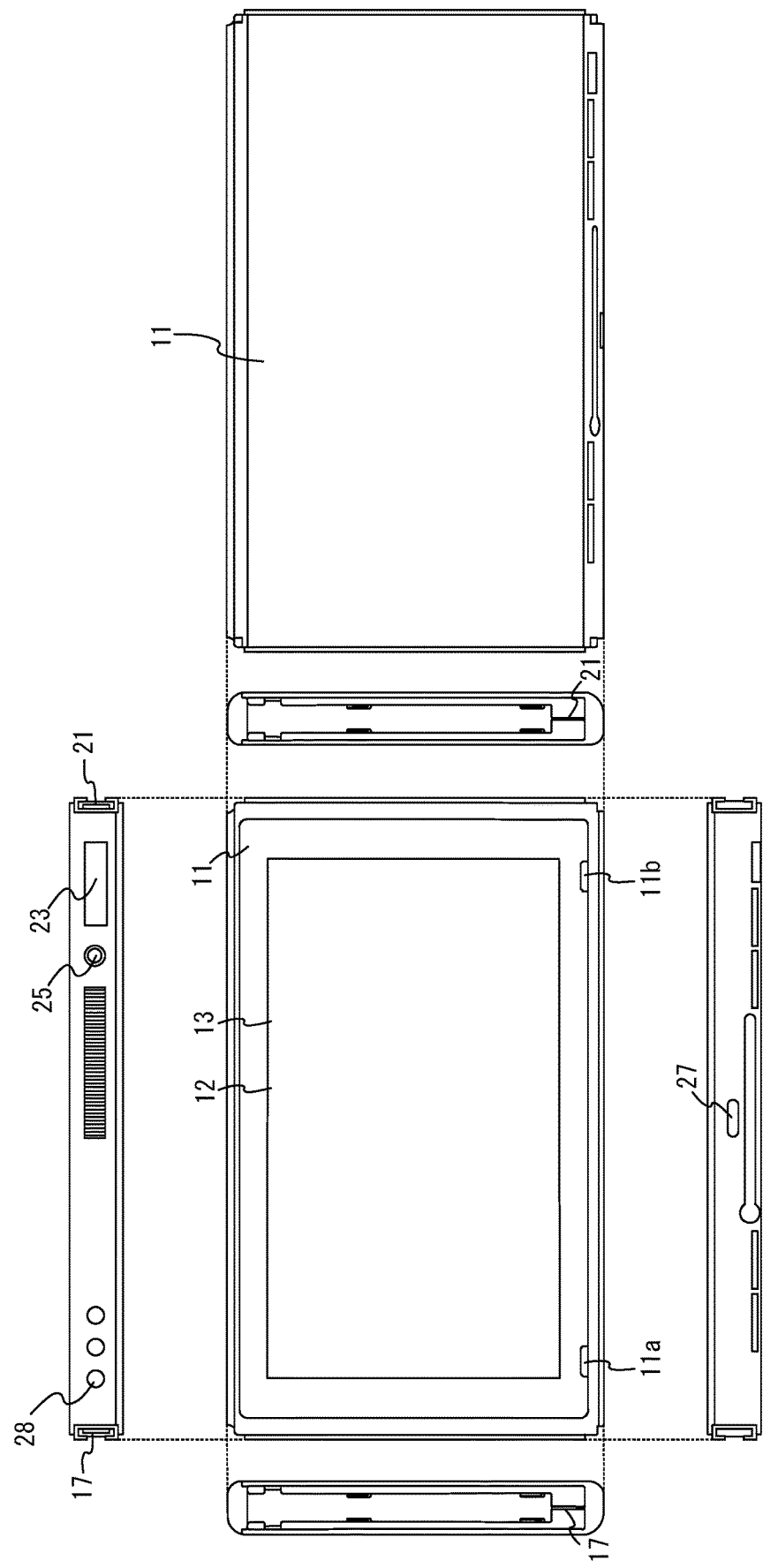
FIG. 3 is six orthogonal views showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

The main body apparatus 2 includes a lower terminal 27. The lower terminal 27 is a terminal for the main body apparatus 2 to communicate with a cradle. In the exemplary embodiment, the lower terminal 27 is a USB connector (more specifically, a female connector). Further, when the unified apparatus or the main body apparatus 2 alone is mounted on the cradle, the game system 1 can display on a stationary monitor an image generated by and output from the main body apparatus 2. Further, in the exemplary embodiment, the cradle has the function of charging the unified apparatus or the main body apparatus 2 alone mounted on the cradle. Further, the cradle has the function of a hub device (specifically, a USB hub).

Figure 4:
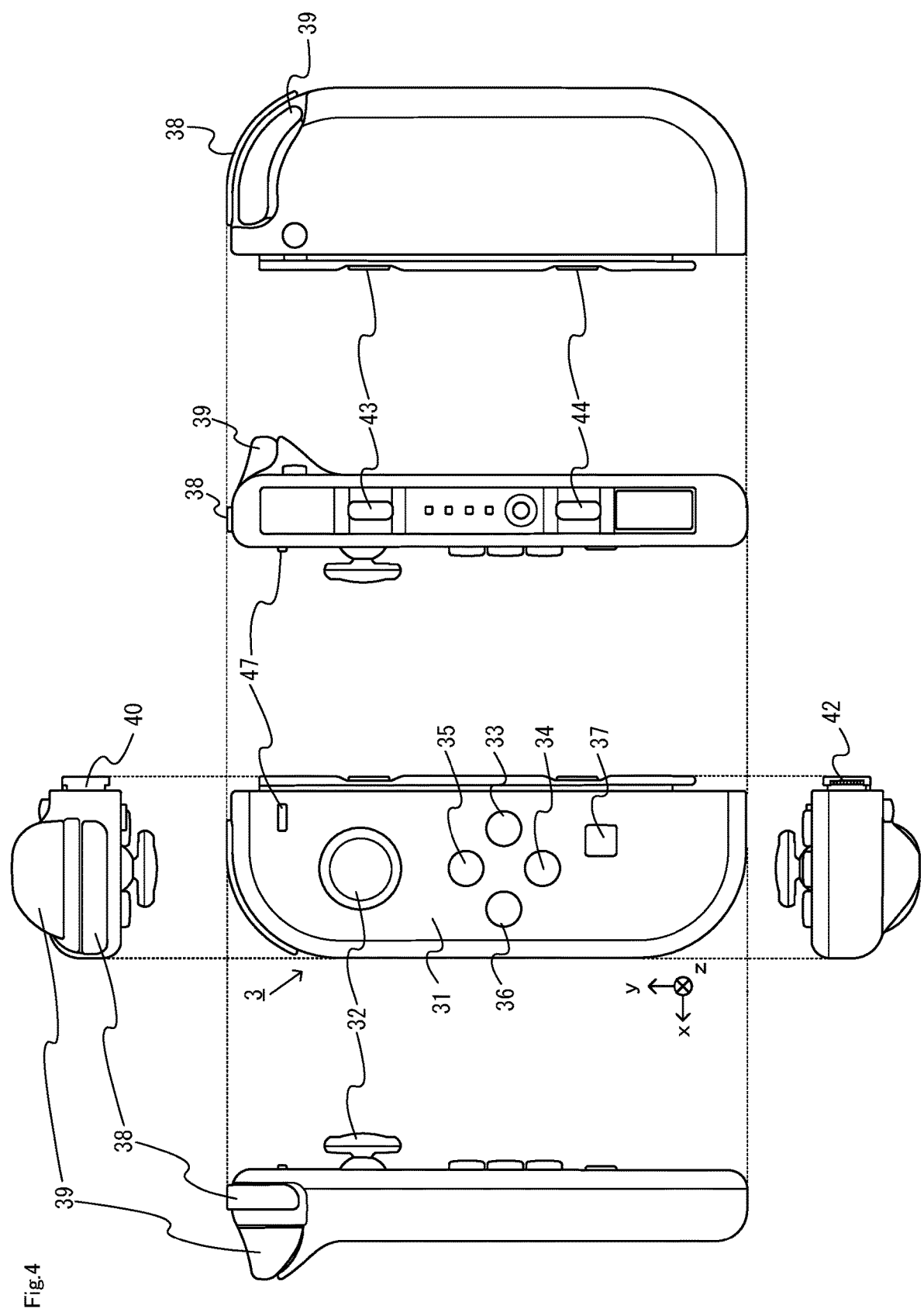
FIG. 4 is six orthogonal views showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2. Further, the left controller 3 includes a terminal 42 for the left controller 3 to perform wired communication with the main body apparatus 2.

Figure 5:
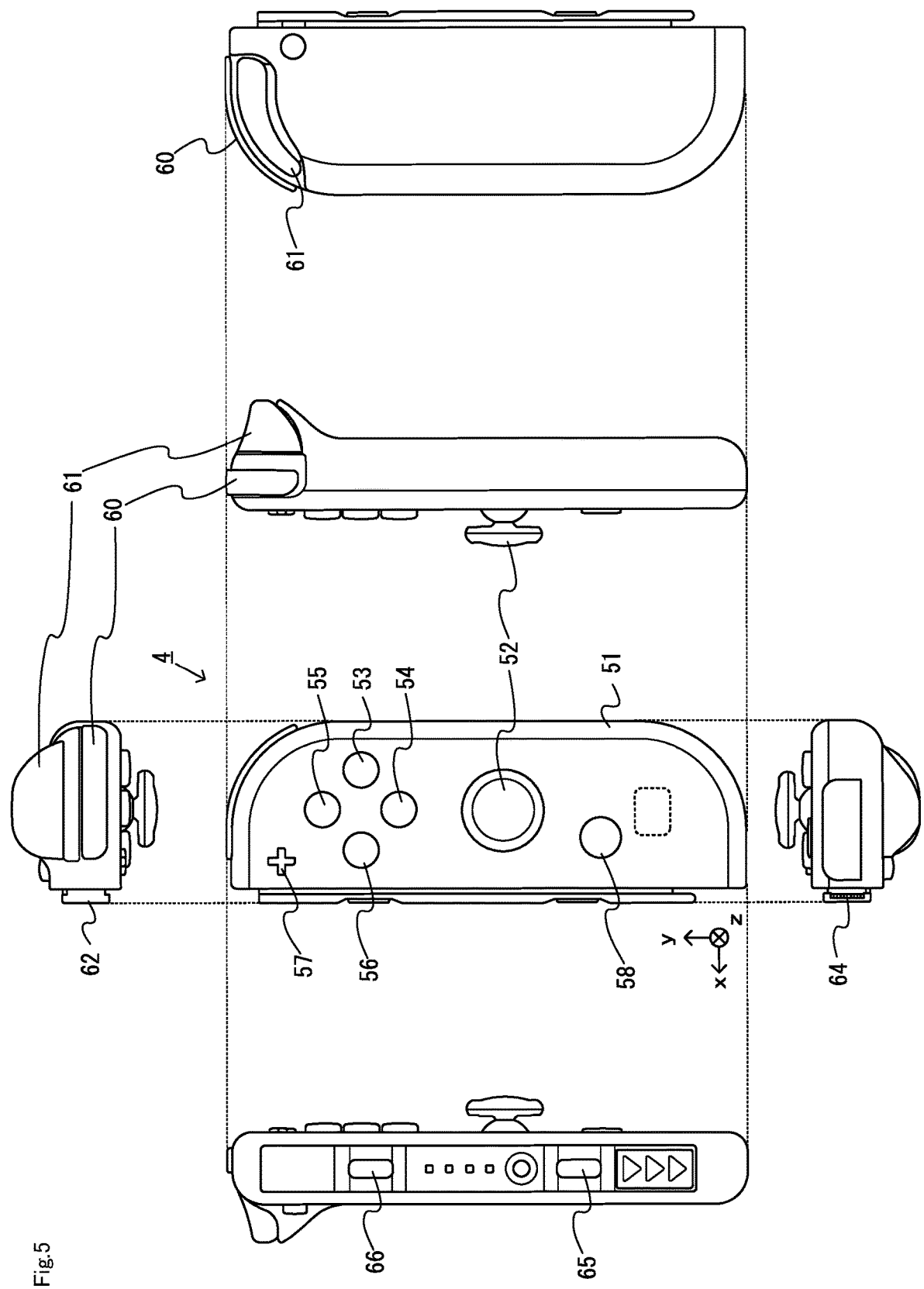
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
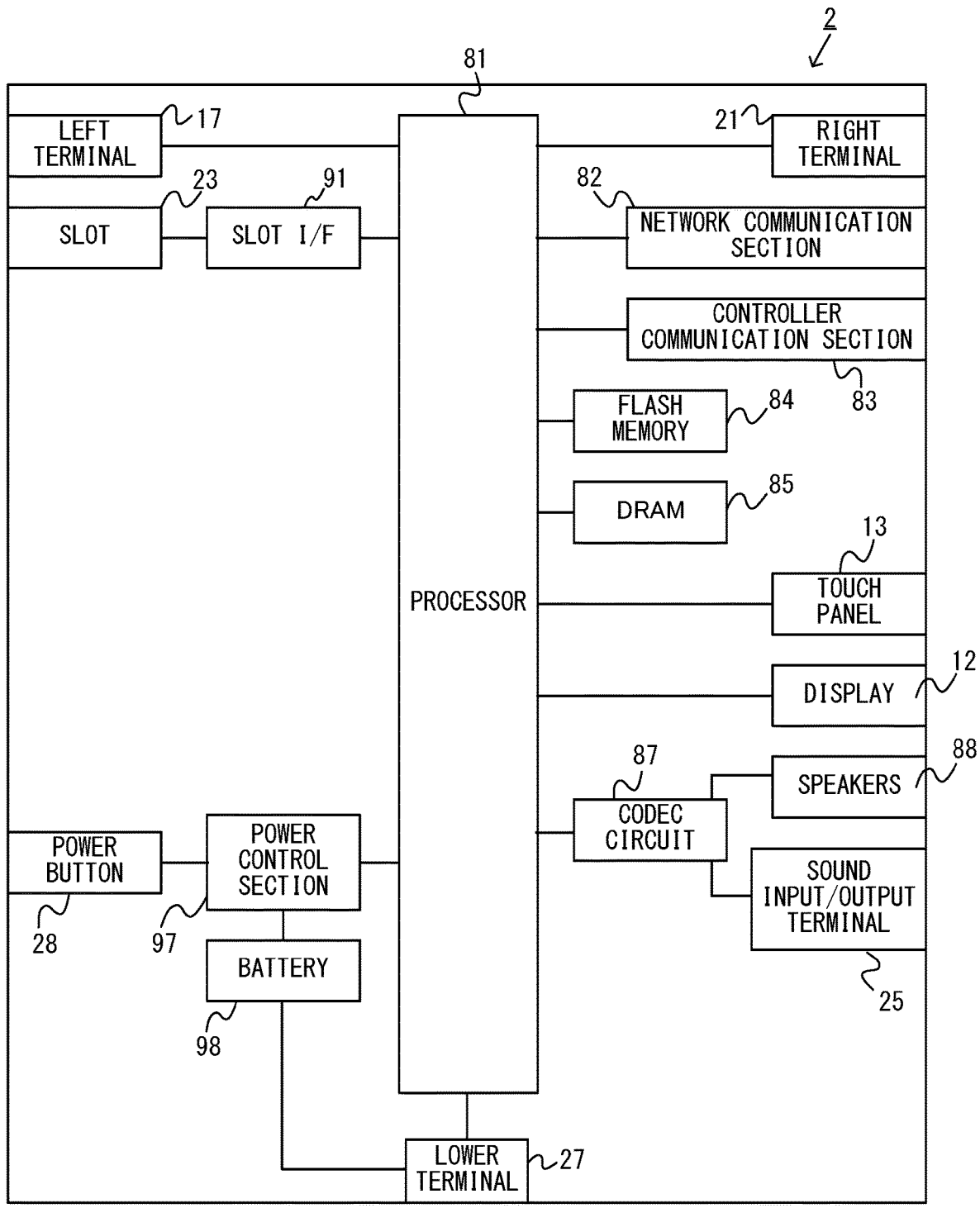
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 3. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a network communication section 82. The network communication section 82 is connected to the processor 81. The network communication section 82 communicates (specifically, through wireless communication) with an external apparatus via a network. In the exemplary embodiment, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 placed in a closed local network area, and the plurality of main body apparatuses 2 directly communicate with each other to transmit and receive data.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, the right terminal 21, and the lower terminal 27. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. Further, when communicating with the cradle, the processor 81 transmits data to the cradle via the lower terminal 27. As described above, in the exemplary embodiment, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a plurality of users can simultaneously provide inputs to the main body apparatus 2, each using a set of the left controller 3 and the right controller 4. As an example, a first user can provide an input to the main body apparatus 2 using a first set of the left controller 3 and the right controller 4, and simultaneously, a second user can provide an input to the main body apparatus 2 using a second set of the left controller 3 and the right controller 4.

Further, the display 12 is connected to the processor 81. The processor 81 displays a generated image (e.g., an image generated by executing the above information processing) and/or an externally acquired image on the display 12.

The main body apparatus 2 includes a codec circuit 87 and speakers (specifically, a left speaker and a right speaker) 88.

The codec circuit 87 is connected to the speakers 88 and a sound input/output terminal 25 and also connected to the processor 81. The codec circuit 87 is a circuit for controlling the input and output of sound data to and from the speakers 88 and the sound input/output terminal 25.

The main body apparatus 2 includes a power control section 97 and a battery 98. The power control section 97 is connected to the battery 98 and the processor 81. Further, although not shown in FIG. 6, the power control section 97 is connected to components of the main body apparatus 2 (specifically, components that receive power supplied from the battery 98, the left terminal 17, and the right terminal 21). Based on a command from the processor 81, the power control section 97 controls the supply of power from the battery 98 to the above components.

Further, the battery 98 is connected to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
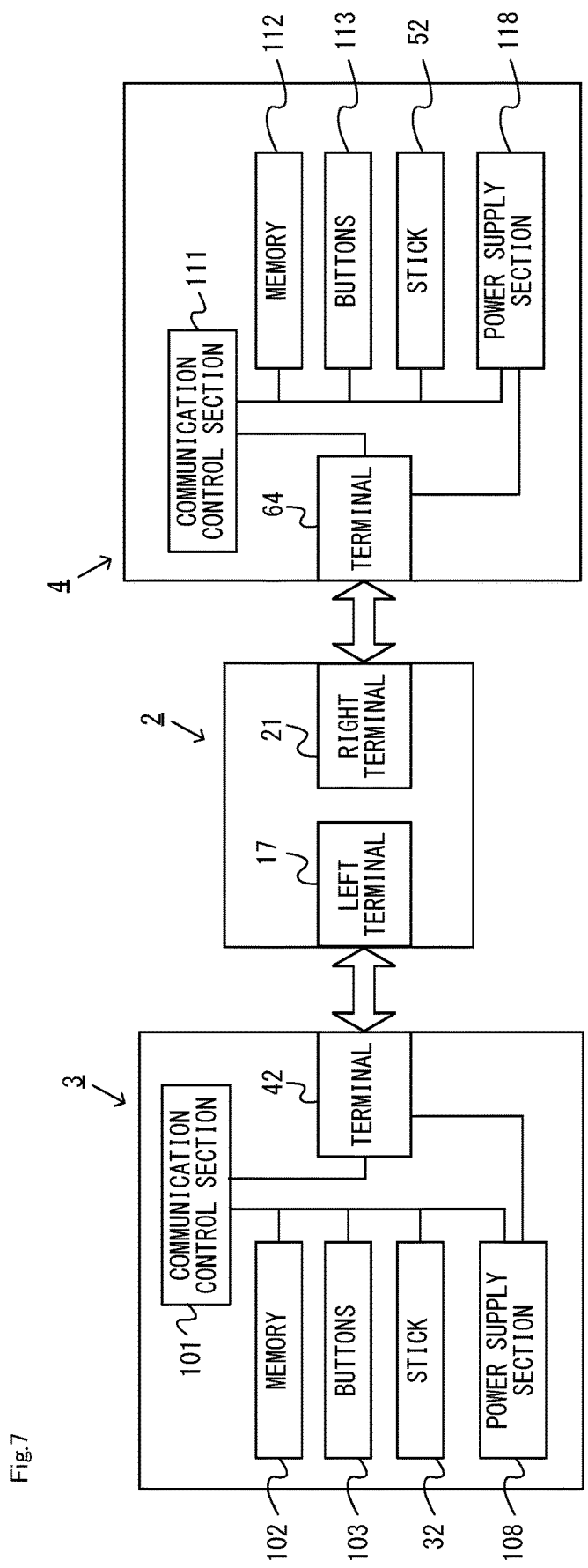
FIG. 7 is a block diagram showing examples of internal configurations of a non-limiting main body apparatus, a non-limiting left controller, and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Processing in Game System]

Next, an outline of game processing executed in a game system 1 will be described with reference to FIGS. 8 to 14. In the exemplary embodiment, a game in which a player (in other words, a user) successively plays a plurality of types of mini games (also referred to as petit games), is performed. Although described later in detail, each mini game is a game that is finished in a few seconds to about ten seconds from start of the game.

[2-1. Outline of Game]

Figure 8:
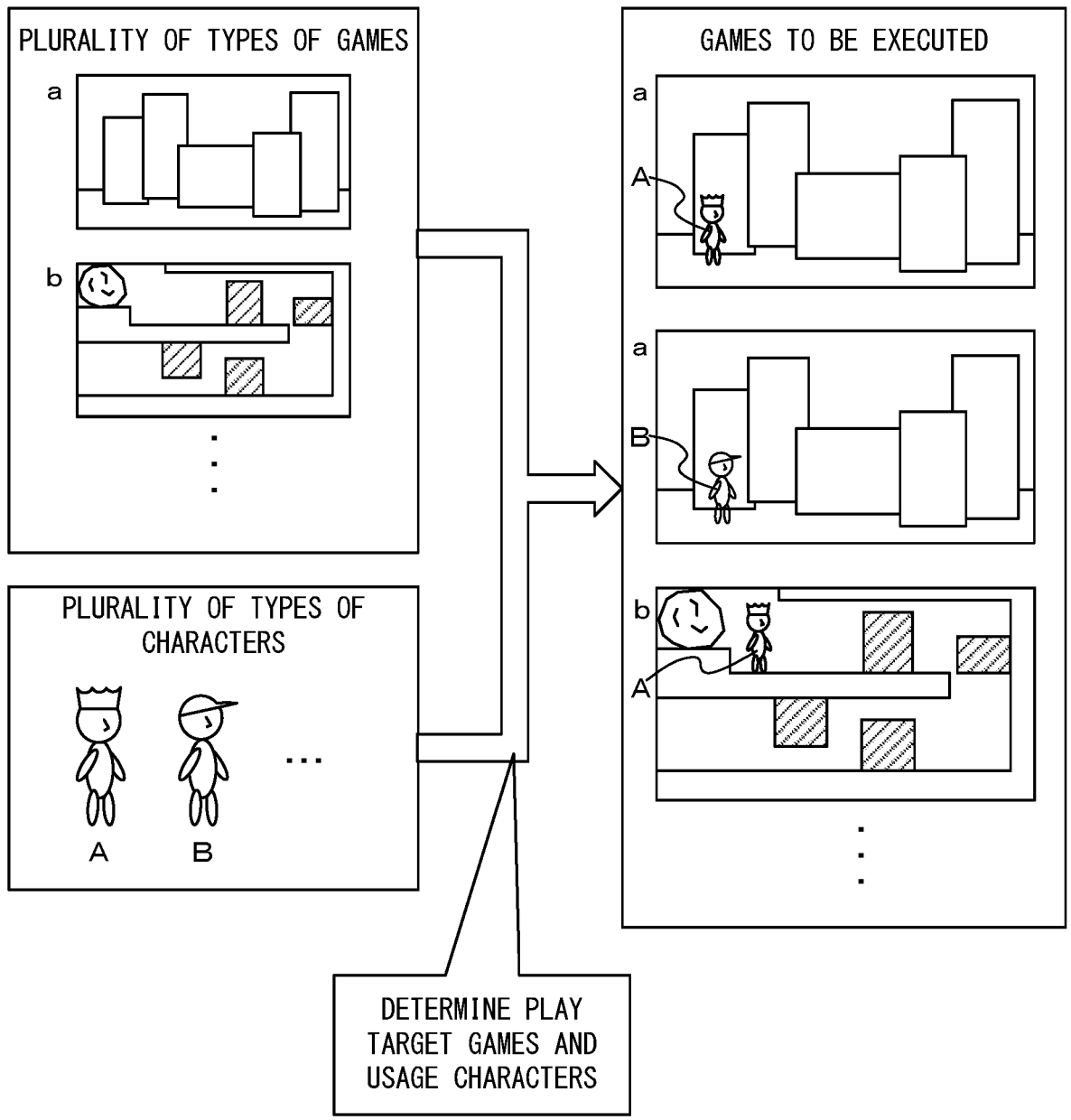
FIG. 8 shows an example of a method for determining mini games to be played.

FIG. 8 shows an example of a method for determining mini games to be played. As shown in FIG. 8, a plurality of types of mini games (e.g., mini games a and b in FIG. 8) are prepared in a game program. These mini games are different games. For example, at least one of a game field, an object that appears (e.g., an enemy character, an item, etc.), and a rule (including a clear condition) differs among the mini games. The game system 1 selects, out of the plurality of types of mini games, some mini games (referred to as "play target games") to be played by the player (see FIG. 8).

As shown in FIG. 8, in the exemplary embodiment, a plurality of types of characters (e.g., characters A and B in FIG. 8) are prepared in the game program, as characters to be operated by the player in the mini games. In the exemplary embodiment, the respective characters are different in the operation method. For example, character's movement (e.g., the direction or method of movement) according to a direction input made by the player differs among the characters, or character's motion according to a predetermined motion instruction input made by the player differs among the characters. The game system 1 determines, out of the plurality of types of characters, some characters as characters (referred to as "usage characters") to be used in the play target games (see FIG. 8).

As described above, in the exemplary embodiment, the play target games are determined from among the plurality of types of mini games, and the usage characters are determined from among the plurality of types of characters. In the exemplary embodiment, the respective usage characters are different in the operation method. Therefore, even in one type of play target game, if different types of usage characters are used in this game, the strategic method and the fun factor of the game will vary. For example, with reference to FIG. 8, even when one type of mini game a is used for two play target games, the strategic method and the fun factor vary between when the usage character is the character A and when the usage character is the character B. In the exemplary embodiment, the game system 1 can provide a variety of games as many as a number obtained by multiplying the number of mini games by the number of characters. Thus, according to the exemplary embodiment, the variations of mini games to be provided to the player can be increased by combinations of mini games and characters. Moreover, the player is prevented from getting tired of the mini games.

[2-2. Game Flow]

Next, an example of a game flow executed in the exemplary embodiment will be described. In the exemplary embodiment, the game system 1 executes a game in units of stages each including a plurality of types of mini games. That is, when the player has started a game in one stage, a plurality of types of mini games are successively performed in this stage. In the following, a game flow in one stage will be described.

Figure 9:
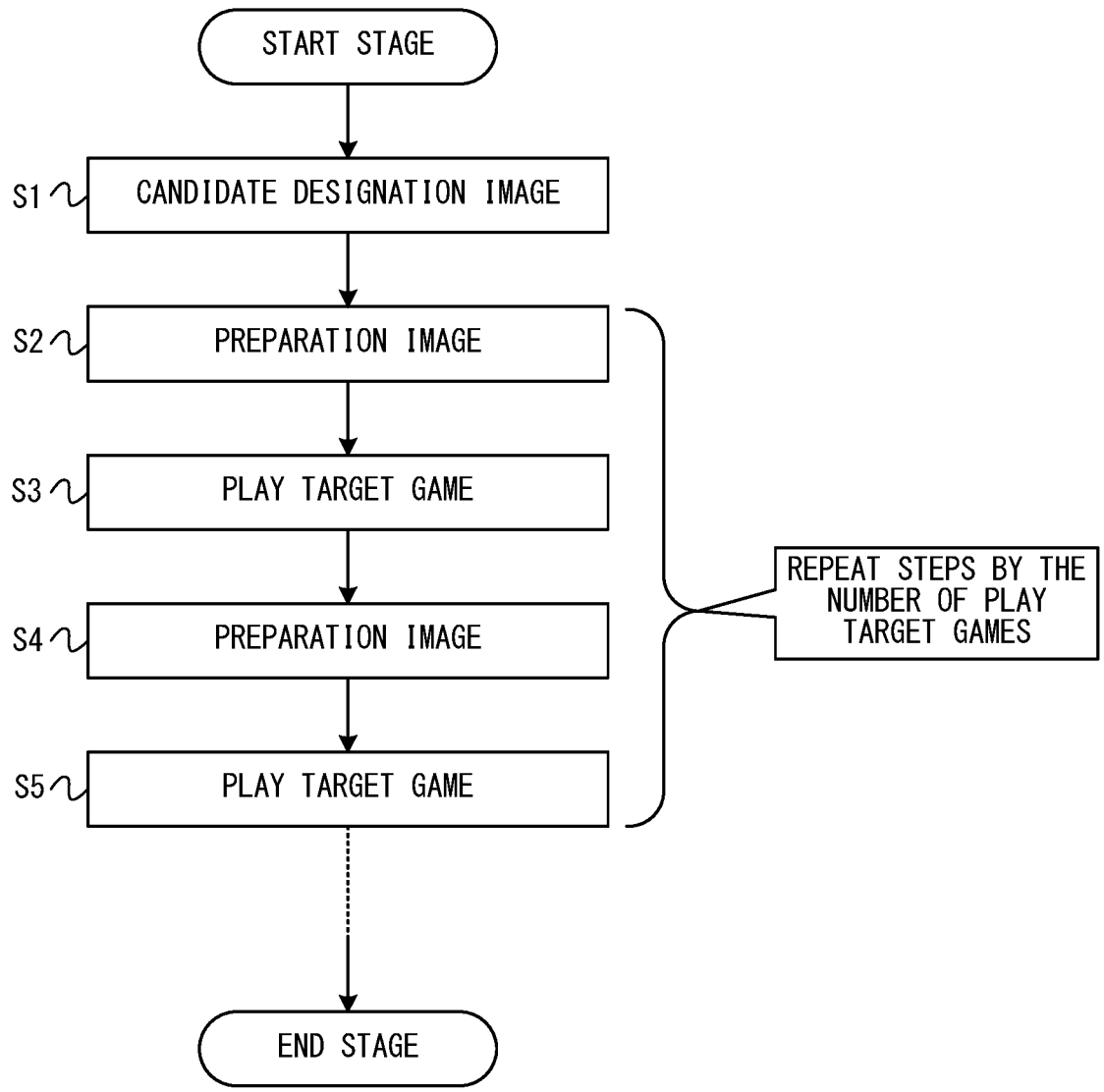
FIG. 9 shows an example of a game flow in a stage.

FIG. 9 shows an example of the game flow in the stage. When the stage has been started in response to an instruction of the player, the game system 1 displays a candidate designation image on a display device (step S1). In the exemplary embodiment, the display device on which various images are displayed may be the display 12 or a stationary monitor.

Figure 10:
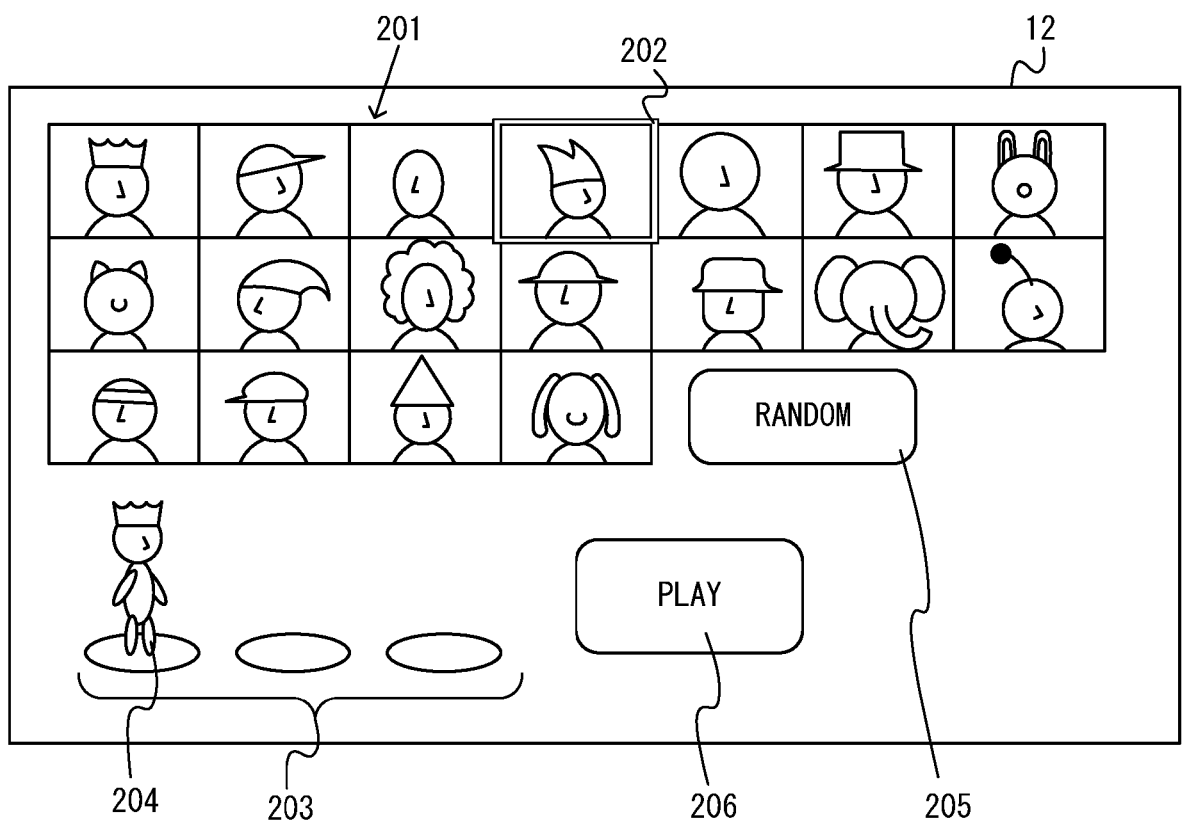
FIG. 10 shows an example of a candidate designation image.

FIG. 10 shows an example of the candidate designation image. The candidate designation image is an image serving as a user interface on which the player designates characters as candidates (referred to as "candidate characters") to be used in the mini games (i.e., play target games) in the stage. The game system 1 receives, from the player, an instruction of designating candidate characters from among a plurality of types of characters on the candidate designation image, and determines candidate character according to the instruction of the player.

In the exemplary embodiment, the candidate designation image includes a character image 201 (see FIG. 10). The character image 201 indicates a plurality of types of characters prepared in the game program. In the exemplary embodiment, 18 types of characters are prepared. The number of characters to be prepared is arbitrary, and may be any number not less than 2.

As described above, the operation methods of the respective characters are different from each other. In the exemplary embodiment, motions of the 18 types of characters A to R are controlled according to an input to an analog stick (i.e., the analog stick 32 or 52 of the controller 3 or 4) for inputting a direction, and an input to a predetermined button (e.g., the left direction button 36 of the left controller 3 or the A-button 53 of the right controller 4, which is referred to as "motion instruction button" hereinafter) for performing the motion instruction input. Specifically, the motions of the 18 types of characters A to R are controlled according to the following operation methods.

(Character A)

This character:

Moves while changing the direction, according to an input to the analog stick. This movement may be limited in the left-right direction.

Rushes in the direction that it faces, according to an input to the motion instruction button.

Is not influenced by gravity (i.e., does not fall even when it is in mid-air).

(Character B)

This character:

Moves while changing the direction, according to left and right inputs to the analog stick.

Jumps according to an input to the motion instruction button.

Is influenced by gravity (i.e., falls when it is in mid-air).

(Character C)

This character:

Faces a direction in which an input is made to the analog stick. When there is no input, the character C faces the front.

Shoots a bullet in the direction that it faces, according to an input to the motion instruction button.

Is influenced by gravity.

(Character D)

This character:

Moves while changing the direction, according to an input to the analog stick.

Throws a boomerang, according to an input to the motion instruction button (after the boomerang is thrown, the boomerang returns).

Cannot move while the boomerang is thrown, and the boomerang moves according to an input to the analog stick.

Is not influenced by gravity.

(Character E)

This character:

Moves according to an input to the analog stick (this character always faces to the right).

Shoots a bullet rightward, according to an input to the motion instruction button.

Is not influenced by gravity.

(Character F)

This character:

Changes the direction according to an input to the analog stick.

Moves in the direction that it faces, according to an input to the motion instruction button, while the input is performed.

Is influenced by gravity.

(Character G)
This character:
Automatically moves in the horizontal direction regardless of an input to the analog stick (but stops while it takes out a yo-yo).
Moves in the opposite direction when it hits a wall or the like.
Shoots a yo-yo upward, according to an input to the motion instruction button.
Is influenced by gravity.
(Character H)
This character:
Moves according to an input to the analog stick.
Shoots a bullet upward, according to an input to the motion instruction button.
Is not influenced by gravity.
(Character I)
This character:
Moves according to left and right inputs to the analog stick, while constantly repeating jumping (this character always faces to the right).
Shoots a bullet rightward, according to an input to the motion instruction button.
Is influenced by gravity.
(Character J)
This character:
Changes the direction according to an input to the analog stick.
Rushes in the direction that it faces, according to an input to the motion instruction button.
Is influenced by gravity.
(Character K)
This character:
Moves while changing the direction, according to an input to the analog stick.
Shoots a bullet in the direction that it faces, according to an input to a predetermined button.
Is not influenced by gravity.
(Character L)
This character:
Moves according to an input to the analog stick.
Emits a light beam downward, according to an input to the motion instruction button, while the input is performed (an object hit by the light beam is drawn upward).
Is not influenced by gravity.
(Character M)
This character:
Moves an aim according to an input to the analog stick.
Moves to the position of the aim, according to an input to the motion instruction button.
Is influenced by gravity.
(Character N)
This character:
Moves while changing the direction, according to an input to the analog stick.
Drops a bomb according to an input to the motion instruction button.
Is not influenced by gravity.
(Character O)
This character:
Moves while changing the direction, according to left and right inputs to the analog stick.
Jumps according to an input to the motion instruction button.
Is influenced by gravity.
Can stick to a ceiling when it jumps, and the direction of gravity with respect to this character is inverted while it sticks to the ceiling.
(Character P)
This character:
Moves while changing the direction, according to left and right inputs to the analog stick. This character steeply falls according to a downward input while it is in mid-air.
Moves upward according to an input to the motion instruction button.
Is influenced by gravity.
(Character Q)
This character:
Discharges a stream of water according to an input to the analog stick, and moves in a direction opposite to the water discharge direction.
Switches between discharge and stop of the stream of water, according to an input to the motion instruction button.
Is influenced by gravity.
Stops without being influenced by gravity when the scream of water is stopped.
(Character R)
This character:
Moves while changing the direction, according to left and right inputs to the analog stick.
Thrusts its tongue out obliquely upward with respect to the advancing direction, according to an input to the motion instruction button, while the input is performed.
Is influenced by gravity.

As described above, the respective characters are different in the operation method. The phrase "different in the operation method" means: (a) different in a motion (including movement) that each character performs in response to an input by the player; (b) different in a motion that each character can take; and (c) different in a rule regarding a motion that each character performs (e.g., whether or not the motion of the character is caused by an influence of gravity). In the exemplary embodiment, some characters (e.g., the character A) move according to an input to the analog stick so as to move in the input direction while others (e.g., the character C) just face the input direction. In addition, a motion that each character performs according to an input to the motion instruction button also varies. Therefore, depending on which character is used, the strategic method and the fun factor of each mini game significantly varies, thereby increasing the variations of mini games.

In the exemplary embodiment, the respective characters can be operated according to inputs to the analog sticks and the motion instruction button on the controllers although the operation methods thereof are different from each other. That is, the game system 1 controls the motions of the characters according to inputs to the analog sticks and the motion instruction button, and does not control them according to other inputs. Therefore, the player, who does not grasp the operations for the characters, can try to perform input operations to the analog sticks and the motion instruction button for any character, and thus can grasp the operation methods for the characters. Thus, even when multiple characters to be operated by various operation methods are prepared, the player can easily grasp the operations for the respective characters.

In the exemplary embodiment, the 18 types of characters are prepared on assumption that the game is played by a single player. In another embodiment, the game may be played by a plurality of players, and a usage character may be automatically determined for each player, thereby further increasing the variations. In the case of two players, as for a certain character (specifically, the character E or the character I always facing to the right), if this character is selected for the second player, this character may be changed to another character that faces to the left. In the case of two players, the initial position of a character operated by the first player is on the left side while the initial position of a character operated by the second player is on the right side. That is, the character that can easily shoot a bullet from its initial position is selected for each player, thereby avoiding a situation that only one of the two players is disadvantaged. In another embodiment, even in the case of a single player, a character facing to the right may be changed to a character facing to the left if the initial position of the character in the mini game is on the right side.

In the state where the candidate designation image shown in FIG. 10 is displayed, the player designates desired characters, as many as a predetermined number of candidates, as candidate characters from among the characters shown in the character image 201. The number of candidates is three in this embodiment, but may be any number not less than two. For example, the number of candidates may be equal to or different from the number of mini games included in the stage. The number of candidates may be set for each of the stages in the game, or may be common to the stages.

In the exemplary embodiment, the player moves a frame image 202, and performs a designation instruction while the frame image 202 encloses an image of a desired character among the characters shown in the character image 201. Thus, the character is designated as a candidate character. As shown in FIG. 10, the candidate designation image includes a character area image 203. The character area image 203 includes areas as many as the number of candidates (three in this embodiment). In these areas, candidate characters 204 designated by the user are displayed. When the player has performed character designating instructions as many as the number of candidates, the candidate characters 204 are respectively displayed in the areas in the character area image 203.

In the exemplary embodiment, the candidate designation image includes an automatic designation instruction image 205. When an input to the automatic designation instruction image 205 (e.g., a predetermined input performed with the frame image 202 enclosing the automatic designation instruction image 205) has been performed, the game system 1 automatically designates characters as many as the number of candidates from among the characters shown in the character image 201. Moreover, the game system 1 displays the designated candidate characters in the areas in the character area image 203. Thus, designation of candidate characters may be automatically performed, independently of selection by the player. The game system 1 may designate candidate characters by any method, for example, at random or according to a predetermined rule. Instead of designating candidate characters completely at random, the game system 1 may preferentially designate a character that is less frequently used, or may designate candidate characters in a predetermined order.

As shown in FIG. 10, the candidate designation image includes a start instruction image 206 for the player to perform a start instruction. The game system 1 ends the display of the candidate designation image, according to a start instruction (i.e., an input to the start instruction image 206) performed while the candidate characters as many as the number of candidates are designated.

In the exemplary embodiment, candidate characters are designated from among the characters prepared in the game program. In another embodiment, candidate characters may be designated from among some of the prepared characters. That is, characters that the player can designate as candidate characters may be some characters among the prepared characters. For example, in the other embodiment, the game system 1 may firstly set only some (e.g., five) characters among the prepared characters to be selectable as candidate characters, and may increase the number of characters selectable as candidate characters each time the player clears a stage of the game.

When the start instruction has been performed, the game system 1 starts a preparation period, and displays a preparation image on the display device (step S2 in FIG. 9). The preparation period is a time period that allows the player to perform preparation regarding a play target game before the play target game is started. Therefore, before starting the preparation period, the game system 1 determines play target games to be performed in the stage and usage characters to be used in the play target games.

Firstly, the game system 1 automatically determines play target games from among prepared mini games. The phrase "automatically determines" means that the game system 1 performs the determination independently of selection by the player. The phrase "automatically determines" means that the game system 1 performs the determination without considering selection by the player at the present time, and may mean that the game system 1 may perform the determination while considering selection by the player in the past, for example. That is, for example, if a game mode in which the player selects a desired mini game and plays the mini game is prepared in the game program, the game system 1 may determine play target games while considering the history of selection in the game mode. Moreover, the phrase "automatically determines" is irrelevant to whether or not the player instructs execution of a determination process. For example, the game system 1 may start the determination process according to an instruction (e.g., the start instruction) by the player.

A specific method for automatically determine play target games is arbitrary. For example, the game system 1 may select and determine play target games at random from among the prepared mini games. The phrase "select at random" means not only that the selection result becomes random in a strict sense, but also that, as for multiple times of trials (selections), the selection results are not the same. Moreover, the game system 1 may select and determine play target games from among the prepared mini games according to a predetermined rule. For example, the game system 1 may determine, as play target games, mini games that have been less frequently determined as play target games.

The game system 1 automatically determines usage characters to be used in the determined play target games, from among the candidate characters. Determination of usage characters is performed such that a specific character is not uniquely determined for a specific play target game. In the exemplary embodiment, the game system 1 determines usage characters at random from among the candidate characters. At this time, the game system 1 may determine usage characters at random, based on the situation in the stage being executed (e.g., scores the player has earned, the number of mini games the player has cleared, etc.). For example, in a case where the player has failed to clear a previous mini game in the stage being executed, the game system 1 may determine usage characters at random such that a character that is compatible with a mini game as a next play target game (e.g., a character supposed to be suitable to the strategy for the play target game) is more likely to be selected. The game system 1 may not necessarily determine usage characters at random, and may determine usage characters according to a predetermined rule (such that a specific character is not uniquely determined for a specific play target game). For example, the game system 1 may determine usage characters such that the candidate characters are assigned in a predetermined order to a plurality of play target games in one stage.

As described above, in the exemplary embodiment, the game system 1 determines usage characters at random from among a plurality of characters. Thus, various characters are used as usage characters for play target games, which enables the player to play one play target game with many variations. Moreover, since it is difficult for the player to predict the usage characters in the play target games, the player can play each play target game with a fresh feeling.

As described above, the game system 1 automatically determine usage characters from among a plurality of characters that have been designated in advance based on an instruction of the player (e.g., characters designated before the play target games were presented to the player). In this case, the strategy is enhanced because the player is allowed to select the candidate characters, whereby the entertainment characteristics of the game can be enhanced.

Figure 11:
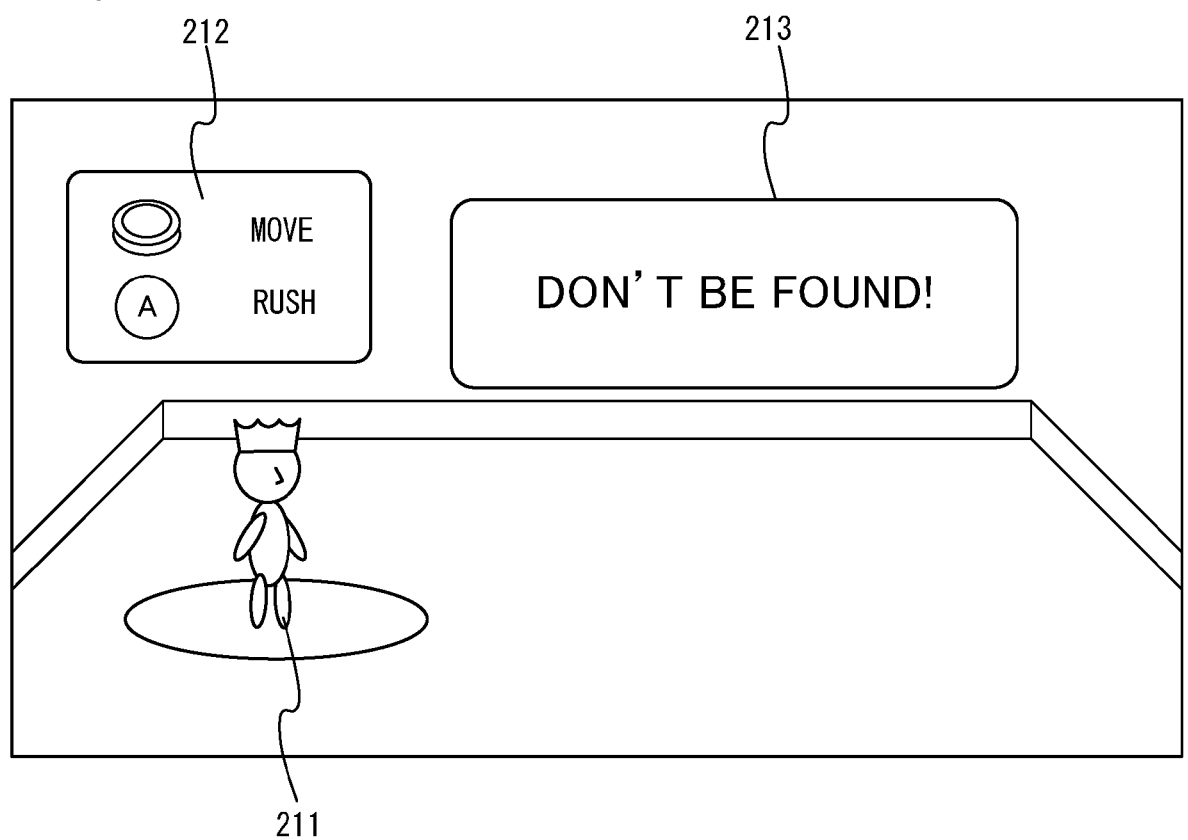
FIG. 11 shows an example of a preparation image.

In another embodiment, the game system 1 may not necessarily designate candidate characters, and may determine usage characters from among all the characters prepared. Thus, the player can be provided with more variations regarding one play target game When the play target games and the usage characters have been determined as described above, the above preparation period is started. The game system 1 firstly displays a preparation image regarding the first play target game. FIG. 11 shows an example of the preparation image. As shown in FIG. 11, the preparation image includes a usage character 211, an operation method image 212, and a game content image 213. In addition to the images 211 to 213, the preparation image may indicate, for example, what number the play target game is in this stage, or the remaining time until the start of the play target game.

The usage character 211 is a character to be used in this play target game. The operation method image 212 indicates an operation method regarding the usage character 211. In the exemplary embodiment, the operation method image 212 indicates: a motion that the usage character 211 performs according to an operation to the analog stick 32 or 52 of the controller 3 or 4 ("move" in FIG. 11); and a motion that the usage character 211 performs according to an operation to the motion instruction button of the controller 3 or 4 ("rush" in FIG. 11).

The game content image 213 indicates the content of this play target game. In the exemplary embodiment, the game content image 213 indicates a clear condition in this play target game (in FIG. 11, a message "Don't be found!", which can be regarded as a hint for clearing the game). The game content image 213 may be any image that allows the player to recognize or predict the content of the play target game. For example, the game content image 213 may indicate the name of the play target game, or may be an image indicating the game field of the play target game (e.g., a thumbnail image of the play target game).

As described above, in the exemplary embodiment, the game system 1 presents, to the player, information regarding the determined play target game (specifically, the game content image) and the usage character, within a predetermined time period (specifically, the preparation period) before the start of the determined play target game. This allows the player to confirm the play target game and the usage character to be used therein, before starting the play target game. For example, the player can predict the content of the game or think about the strategy for the play target game with the usage character, before starting the play target game.

In the exemplary embodiment, the player can actually operate the usage character 211 during the preparation period in which the preparation image is displayed. That is, during the preparation period, the game system 1 receives an input to operate the usage character 211 (i.e., an input to the analog stick or the motion instruction button), and controls the motion of the usage character 211 based on the input.

As described above, in the exemplary embodiment, the game system 1 presents, to the player, the operation method for the determined usage character (specifically, the operation method image) within the predetermined time period. This allows the player to confirm the operation method for the usage character to be used in the play target game, before starting the play target game. Moreover, the game system 1 controls the usage character, based on the operation performed by the player. This allows the player to actually operate the usage character to be used in the play target game, before starting the play target game. Therefore, according to the exemplary embodiment, even a player who does not know how to operate the usage character can roughly grasp the operation method before starting the play target game, and therefore can enjoy the play target game.

In the game according to the exemplary embodiment, mini games (i.e., play target games) and usage characters are determined independently of selection by the player, and the player is caused to clear each mini game within a time limit (described later in detail). Therefore, in the exemplary embodiment, a fun factor of the game resides in that, as for the mini games and the usage characters designated by the game system 1, the player should think of, within a time limit, how to clear each mini game while the player has no idea about the content and the usage character of the next mini game. Therefore, in the exemplary embodiment, the preparation period corresponds to a predetermined length of time (e.g., 3 seconds), and the preparation image is displayed for the predetermined length of time. When the preparation period has ended, the play target game is automatically started. In this case, the player can roughly grasp the content of the play target game and the operation method for the usage character, but cannot sufficiently grasp the content of the play target game and cannot practice the operation of the usage character as much as he/she likes before starting the play target game. Therefore, according to the exemplary embodiment, it is possible to cause the player to play the mini game without decreasing the fun of the game.

When the preparation period has ended, the game system 1 ends the display of the preparation image and starts the play target game (step S3 in FIG. 9). That is, the game system 1 displays, on the display device, a game image (e.g., FIG. 12) showing a game field in which the usage character is disposed, and causes the usage character to take a motion according to an operation by the player.

In the exemplary embodiment, when the display is transitioned (in other words, switched) from the preparation image to the game image, the game system 1 continuously moves an image regarding the usage character from the position where the usage character has been displayed in the preparation image to an initial position of the usage character in the game image. The "image regarding the usage character" may be an image representing the usage character itself, or an image representing an appearance different from the appearance of the usage character. For example, the game system 1 changes the usage character to an effect image of light when the display of the preparation image is ended, moves the effect image of light to the initial position, and changes the effect image of light to the usage character after the game image is displayed. Thus, when the play target game is started, the initial position of the usage character can be shown in an easily understandable manner for the player.

In the exemplary embodiment, a specific content of each mini game as a play target game is arbitrary (a specific example of the play target game will be described later). In the exemplary embodiment, a time limit is set on each mini game. That is, each mini game is a game which is over unless it is cleared within the time limit, or a game which ends when the time limit has elapsed and the game result of which is determined.

In the exemplary embodiment, the time limit of each of the mini games prepared in the game program is set to a time length within 5 seconds. The time lengths of the time limits of the respective mini games need not be the same, and may be different from each other within the range of 5 seconds. Thus, in the exemplary embodiment, in one stage, mini games each to be finished within a short time (5 seconds) are successively performed. This allows the player to play various mini games in a short time with a good tempo. The mini games may include a mini game having a time limit set to a time length within 10 seconds. As described above, since the time limit is set to a reasonably short time (e.g., 5 seconds or 10 seconds), it is possible to provide a game in which the player is required to clear each play target game after quickly understanding the operation method for the usage character within the time limit, whereby the entertainment characteristics of the game can be enhanced. In another embodiment, the mini games may include a game having a time limit set to a time length not shorter than 10 seconds, or a game on which no time limit is set.

When the first play target game has ended in the stage, the game system 1 starts a preparation period regarding the second play target game. That is, the game system 1 displays a preparation image regarding the second play target game on the display device (step S4 in FIG. 9).

In the exemplary embodiment, it is assumed that play target games and usage characters in one stage are determined before the first play target game is started. In another embodiment, after one play target game has ended, the game system 1 may determine a next play target game and a usage character to be used therein.

When the preparation period for the second play target game has ended, the game system 1 starts the second play target game (step S5 in FIG. 9). Thereafter, display of a preparation image and execution of a play target game are repeated for the respective play target games included in this stage (see FIG. 9).

As described above, in the exemplary embodiment, a plurality of play target games in one stage are successively executed. That is, the game system 1 automatically determines the plurality of play target games, and automatically determines a plurality of usage characters to be operated by the player in the respective play target games determined. Then, the game system 1 successively executes the plurality of play target games determined, thereby advancing the game (corresponding to one stage) including the plurality of play target games. Thus, the player is allowed to successively perform the play target games, the contents and the usage characters of which cannot be predicted by the player (because these games are not selected by the player), within the time limit. Thus, the entertainment characteristics of the game in the stage can be enhanced.

When all the play target games included in the stage have ended, this stage ends. When the stage ends, the game system 1 determines the game result of the stage, based on the game results of the respective play target games. For example, the game system 1 determines that the stage is cleared when a predetermined number of games among the play target games are cleared. The content of the game result of the stage and the method for determining the game result are arbitrary. In another embodiment, for example, the game system 1 may determine that the stage is cleared when the total of scores earned in the play target games is higher than or equal to a predetermined value. In still another embodiment, the game result of the stage may be calculated as scores instead of determining as to whether or not the stage is cleared.

In the exemplary embodiment, the stage also ends when a predetermined failure condition is satisfied. For example, the player starts the stage while holding a predetermined number of lives, and the number of the lives decreases each time the player fails in a mini game. When all the lives have run out, the stage fails to be cleared, and ends. In another embodiment, the mini games may be repeated until the lives run out in one stage. In this case, the same mini game may appear a plurality of number of times as play target games.

The game corresponding to each stage can be repeatedly played. In the exemplary embodiment, even when the player plays the same stage, play target games and usage characters are changed for each stage. At this time, the game system 1 may increase the game speed each time the player has cleared the stage (e.g., the game system 1 may increase the speeds of objects such as usage characters that appear in the game, and shorten the time limits).

[2-3. Specific Example of Mini Game]

Figure 12:
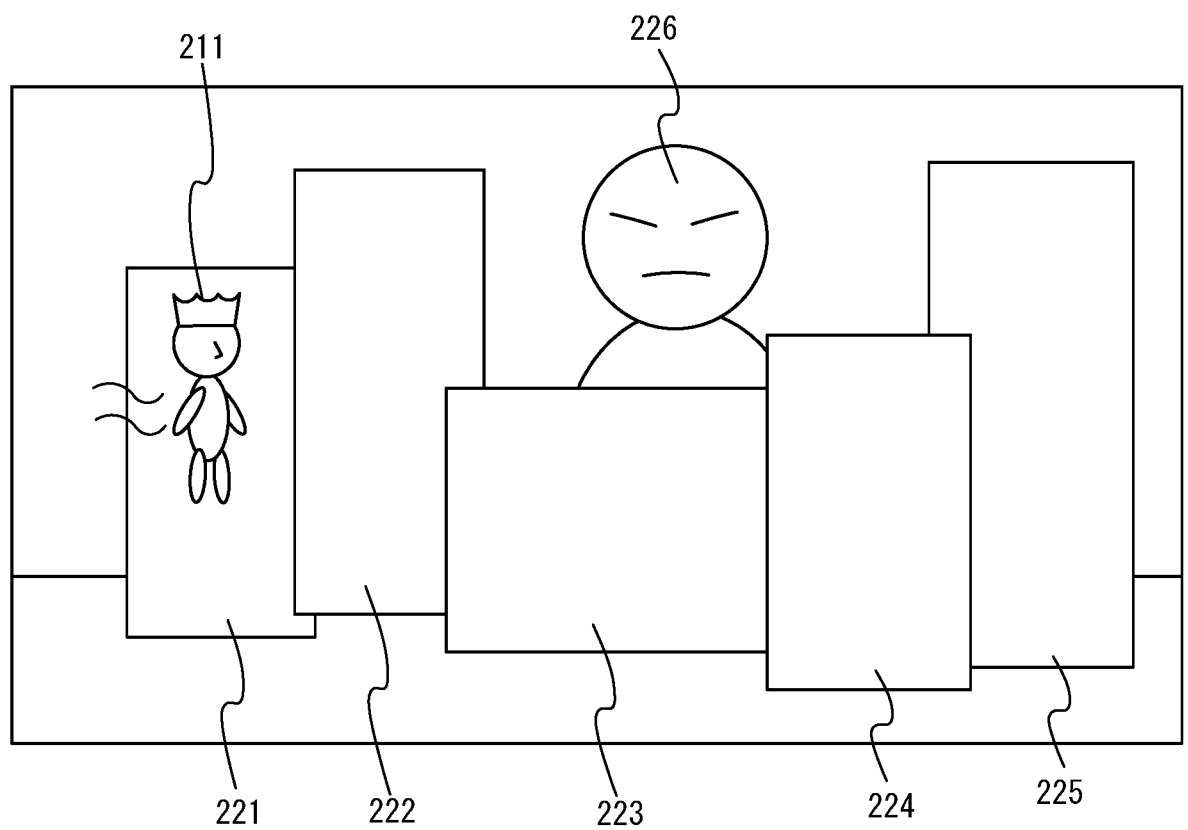
FIG. 12 shows an example of a game image in a non-limiting first game example.

Hereinafter, specific examples of mini games will be described with reference to FIGS. 12 to 14. FIG. 12 shows an example of a game image of a first game example. The first game example is an example of a mini game to be executed after the preparation image shown in FIG. 11. In the first game example, a usage character 211 and a plurality of walls 221 to 225 are disposed in a game field. The walls 221 to 225 are deleted one by one from the game field as time elapses during the game. The player operates the usage character 211 to locate the usage character 211 in a position hidden behind any of the walls 221 to 225 so that the usage character 211 is not found by an enemy 226. In the first game example, the game is over if the usage character 211 is found by the enemy 226, and the game is cleared if the usage character 211 is not found by the enemy within the time limit.

The usage character 211 shown in FIG. 12 is the above character A. As described above, the character A moves while changing the direction, according to an input to the analog stick, and rushes in the direction that it faces, according to an input to the motion instruction button. The character A is not influenced by gravity, and therefore, can move in mid-air, floating off the ground. In the first game example, the player causes the usage character 211 to perform these motions, thereby moving the usage character 211 so as not to be found by the enemy.

Figure 13:
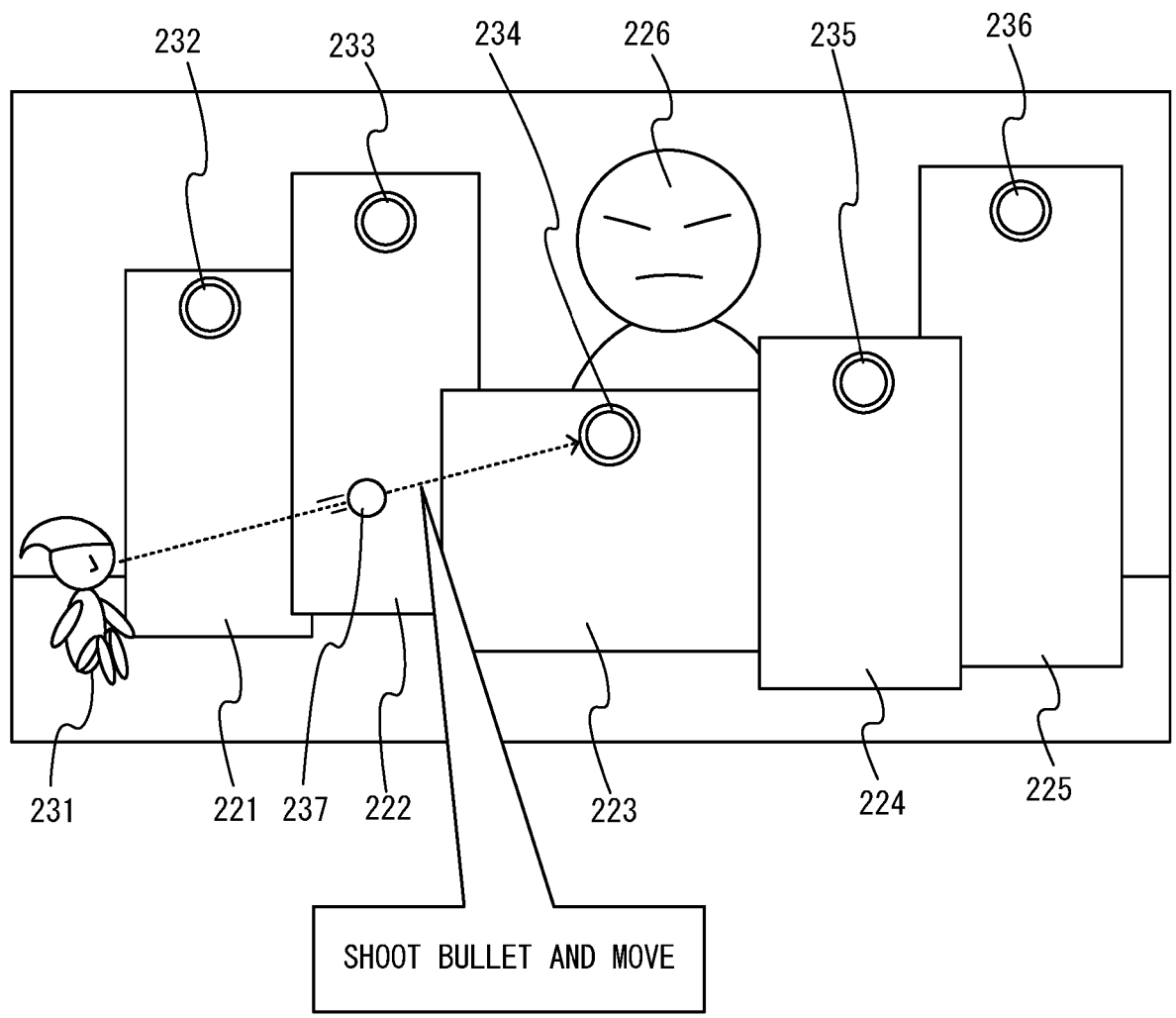
FIG. 13 shows an example of a game image in a non-limiting second game example.

FIG. 13 shows an example of a game image of a second game example. The second game example is an example of a mini game using the same play target game as in the first game example, and using a usage character different from that of the first game example. In the second game example, the same walls 221 to 225 as in the first game example are disposed. In addition, a usage character 231 is disposed. The usage character 231 is the above character C.

As described above, the character C performs: a motion of changing the direction according to an input to the analog stick; and a motion of shooting a bullet (e.g., a bullet 237 shown in FIG. 13) in the direction that it faces, according to an input to the motion instruction button. Thus, the character C is a character of a type that cannot be moved by only a direction input to the analog stick (in FIG. 13, the character C is displayed in a sitting state as a display mode indicating that the character C is of such a type). In the exemplary embodiment, when the character of this type is used as a usage character, the game system 1 disposes objects for movement 232 to 235 in the game field (see FIG. 13). The objects for movement 232 to 235 are objects with which the character of the above type moves in the game field. In the exemplary embodiment, the objects 232 to 235 are ring-like objects. Specifically, when a bullet shot by the character C has hit an object for movement, the game system 1 moves the character C to the position of the object for movement (e.g., the character C hangs on the object for movement). Thus, in the exemplary embodiment, the character C moves by hitting an object for movement with a bullet (see FIG. 13).

In the example shown in FIG. 13, the objects for movement 232 to 235 are disposed at the positions of the walls 221 to 225. However, the objects for movement may be disposed anywhere in the game field. The positions of the objects for movement may be appropriately set based on the game field and/or the clear condition for each mini game. Moreover, the objects for movement may move in the game field, or may be fixedly disposed in the game field. For example, each object for movement may start to move in response to that the character has moved to the position of the object for movement.

In the second game example, the player causes the character C to perform a motion of shooting a bullet toward an object for movement, thereby moving the character C such that the character C is hidden behind any of the walls 221 to 225. Thus, the first game example and the second game example are the same in the clear condition, but are different from each other in the operation to the usage character and the fun factor.

As described above, in the exemplary embodiment, the game system 1 controls an attack motion of shooting an attack object (e.g., a bullet or a boomerang) according to an instruction input (e.g., an input to the motion instruction button), as a control of an attack motion of at least any of a plurality of characters. The game system 1 may control an attack motion of automatically shooting an attack object, as the control of the attack motion. For example, the character may be controlled to continue shooting bullets, regardless of the input to the motion instruction button. Preparing such a character capable of performing an attack motion leads to an increase in variations of character motions, thereby increasing the variations of games made by combinations of characters and mini games.

In the exemplary embodiment, when the usage character is a predetermined character capable of shooting an attack object, the game system 1 starts the play target game by using a virtual space (e.g., a game field) in which an object for movement is disposed (step S32 described later). Then, the game system 1 performs a movement control for moving the predetermined character toward the object for movement when the attack object has come into contact with the object for movement (e.g., when a bullet has hit the object for movement). In the exemplary embodiment, since the character, which performs a movement method different from a movement method in which a character moves according to a simple direction input, is provided, it is possible to increase the variations of games made by combinations of characters and mini games.

Figure 14:
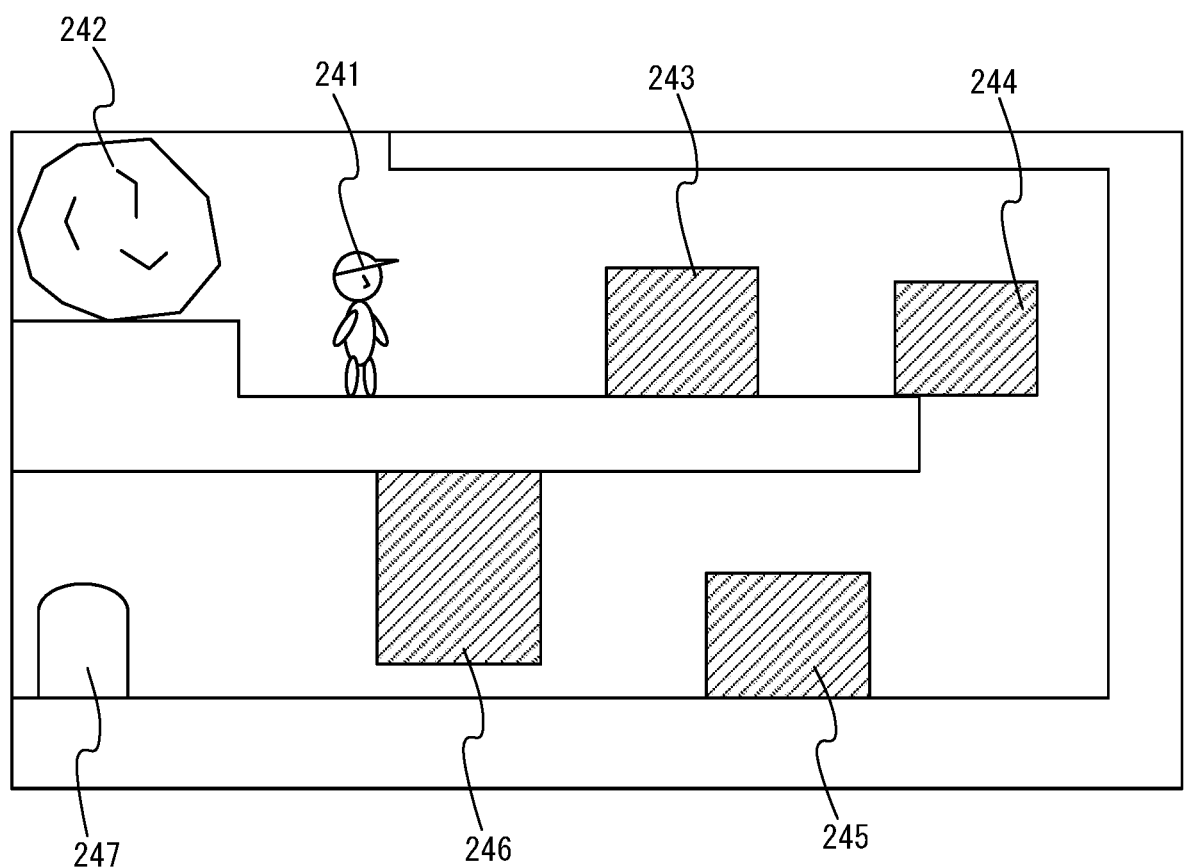
FIG. 14 shows an example of a game image in a non-limiting third game example.

FIG. 14 shows an example of a game image of a third game example. The third game example adopts a play target game different from that of the first and second game examples. In the third game example, a usage character 241, a rock 242, and obstacles 243 to 246 are disposed in a game field. After the game has started, the rock 242 rolls to move toward the usage character 241. The third game example is a game in which the usage character 241 is caused to move to a goal 247 while destroying or avoiding the obstacles 243 to 246 such that the usage character 241 is not hit by the rolling rock 242 approaching behind. In the third game example, the game is over if the usage character 241 is hit by the rock 242 or cannot reach the goal 247 within the time limit, and the game is cleared if the usage character 241 can reach the goal 247 within the time limit.

In the third game example, the usage character can destroy each of the obstacles 243 to 246 when the usage character itself collides against the obstacle or when the usage character hits the object with a bullet shot by itself. For example, the character A can perform a motion of rushing, and therefore can rush toward an obstacle to destroy the obstacle. Meanwhile, the character D can perform a motion of throwing a boomerang, and therefore can hit an obstacle with the boomerang to destroy the obstacle. Thus, as for the game field shown in FIG. 14, the player can clear the game by using the strategic method that varies depending on the usage character.

As described above, in the exemplary embodiment, as for each of a plurality of characters, the game system 1 performs a control such that, when the character comes into contact with a predetermined object (e.g., any of the obstacles 243 to 246) in a virtual space, the predetermined object is caused to generate a predetermined effect (e.g., the obstacle is destroyed). Moreover, as for a character capable of shooting an attack object among the plurality of characters, the game system 1 performs a control such that, when the attack object comes into contact with the predetermined object, the predetermined object is caused to generate the same effect as that generated when the character comes into contact with the object. Thus, in the exemplary embodiment, even the character, incapable of shooting an attack object, can cause the predetermined object to generate the same effect as that generated by the character capable of shooting an attack object. Therefore, it is possible to avoid an inconvenient situation that a mini game cannot be cleared with a character incapable of shooting an attack object.

The specific content of the predetermined effect is arbitrary, and is not limited to destroying an obstacle as described above. As for the predetermined effect, various effects may be set according to objects. For example, when an object is an item that the usage character can acquire, the game system 1 may generate, as the above effect, an effect that the usage character acquires the item when it comes into contact with the item.

As described above, in the exemplary embodiment, the plurality of characters prepared in advance are different from each other in the movement method according to a direction input and a predetermined instruction input (e.g., an input to the motion instruction button). The game system 1, during execution of a play target game, performs a movement control for a usage character in the virtual space according to the movement method corresponding to the usage character, based on the direction input and the instruction input. Thus, in the exemplary embodiment, since the fundamental motion, "movement", differs among characters, the fun factor of the play target game greatly differs depending on which usage character is used in the play target game. Therefore, the variations of games made by combinations of usage characters and play target games can be increased.

In the exemplary embodiment, the direction input is an input to an analog stick, and the instruction input is an input to a button of a controller. However, any input device may be used for performing a direction input and an instruction input. For example, in another embodiment, a direction input and an instruction input may be inputs to a touch panel.

The methods for controlling movements of individual characters are arbitrary. In the exemplary embodiment, as movement control for at least any of a plurality of characters, the game system 1 performs movement control by using at least any of the following methods: (a) a method of moving a usage character in a direction according to a direction input (e.g., a movement control method for the character A); (b) a method of moving a usage character in a predetermined direction according to combination of a direction input and an instruction input (e.g., a movement control method for the character C, the character J, or the character Q); and (c) a method of automatically moving a usage character (e.g., a movement control method for the character G). In another embodiment, as movement control methods for the plurality of characters, not all the three methods described above need to be used, and at least one method out of the three methods may be used. Moreover, the movement control methods for the characters are not limited to the above three methods, and a character to be controlled by another method may be included in the plurality of characters.

In the exemplary embodiment, the plurality of characters include: characters of a first type (e.g., the character B) that are influenced by gravity in the virtual space; and characters of a second type (e.g., the character A) that are not influenced by gravity in the virtual space. When a usage character is a character of the first type, the game system 1, during execution of a play target game, performs movement control for the usage character with the influence of gravity being reflected. For example, the character of the first type is controlled to fall downward when it is in mid-air, or controlled to firstly move upward and then fall downward when an instruction of jumping is made. Meanwhile, when the usage character is a character of the second type, the game system 1, during execution of the play target game, performs movement control for the usage character without the influence of gravity being reflected. Here, the operation feeling of the player to the character greatly differs depending on whether or not the movement control is performed with the influence of gravity being reflected, and therefore, the fun factor of the play target game greatly differs depending on which character is used, the first type or the second type. Thus, in the exemplary embodiment, since the two types of characters are included in the plurality of characters, the variations of games made by combinations of usage characters and play target games can be increased.

[3. Specific Example of Processing in Game System]

Next, a specific example of information processing in the game system 1 will be described with reference to FIGS. 15 to 17.

Figure 15:
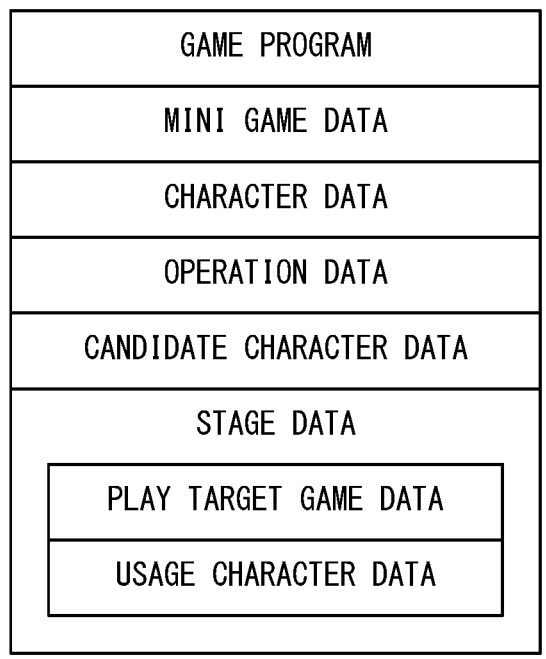
FIG. 15 shows an example of various data used for information processing in a non-limiting game system.

FIG. 15 shows an example of various data used for the information processing in the game system 1. The various data shown in FIG. 15 are stored in a storage medium (e.g., the flash memory 84, the DRAM 85, and/or a memory card attached to the slot 23) that is accessible by the main body apparatus 2.

As shown in FIG. 15, the game system 1 stores therein a game program. The game program is a game program for executing game processing (specifically, stage processing shown in FIG. 16) according to the exemplary embodiment. The game system 1 stores therein mini game data, character data, the operation data, candidate character data, and stage data.

The mini game data is data for executing a plurality of mini games prepared in the game program. For example, the mini game data includes: data of game fields in the mini games; data of various objects (e.g., the aforementioned obstacles, objects for movement, etc.) disposed in the game fields; and data of rules (e.g., clear conditions, time limits, etc.) of the mini games.

The character data indicates a plurality of characters prepared in the game program. For example, the character data includes: data indicating appearances of the characters; and data indicating control methods for the characters (i.e., what motions the characters take according to an input by the player).

The operation data is data indicating an operation performed by the player. As described above, the operation data is transmitted from the controllers 3 and 4 to the main body apparatus 2 and is stored in the main body apparatus 2. In the exemplary embodiment, the operation data includes input data indicating inputs to the respective input sections described above.

The candidate character data is data indicating characters determined as the above candidate characters among the plurality of characters indicated by the character data. The candidate character data is, for example, data of identification information that allows identification of the candidate characters.

The stage data indicates the contents of games in one stage to be executed in stage processing described later. Specifically, the stage data includes: play target game data indicating a plurality of play target games to be executed in the stage; and usage character data indicating usage characters to be used in the plurality of play target games. In the stage data, each play target game is associated with a usage character to be used therein.

Figure 16:
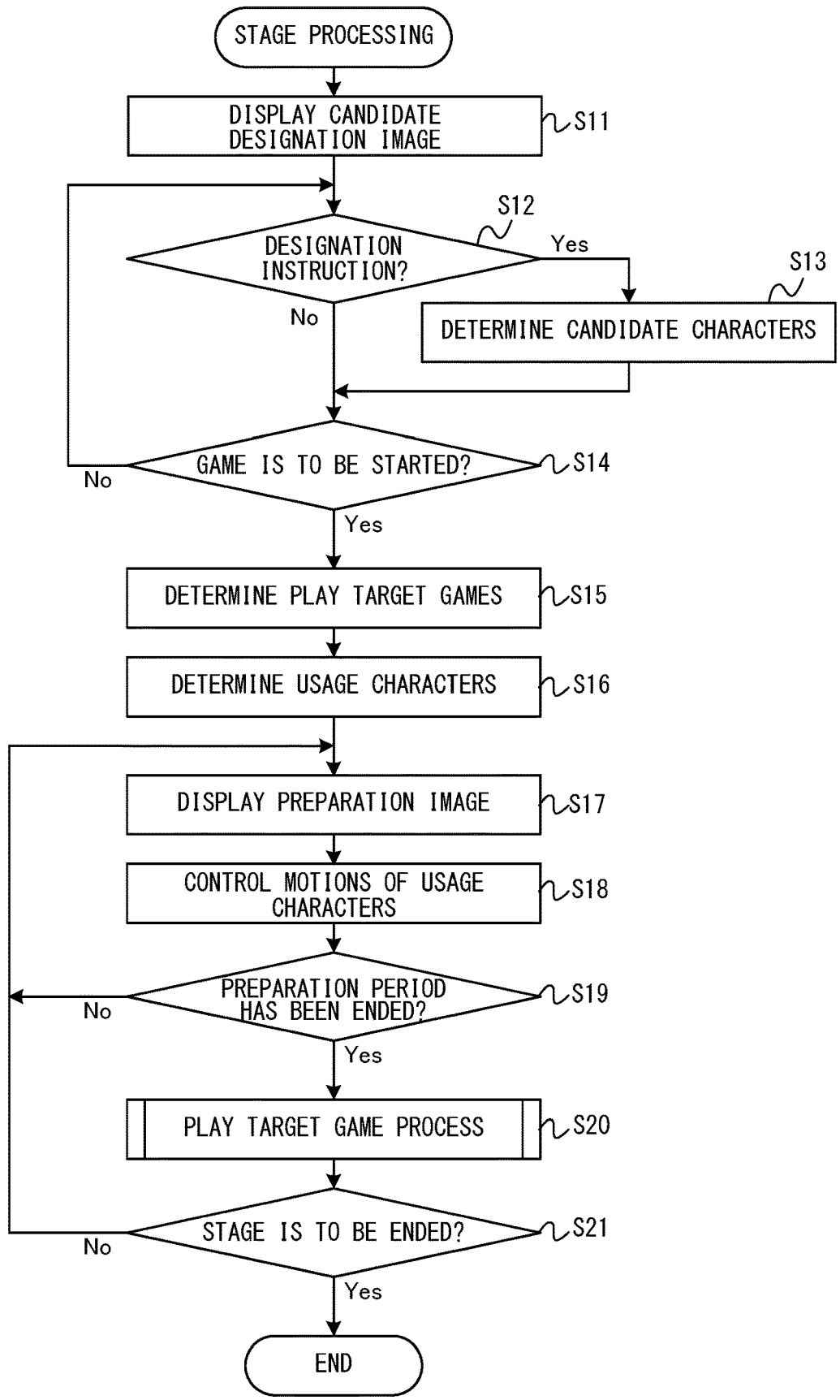
FIG. 16 is a flowchart showing an example of a flow of stage processing executed by the non-limiting game system.

FIG. 16 is a flowchart showing an example of a flow of stage processing executed by the game system 1. The stage processing shown in FIG. 16 is started in response to that the player has performed an instruction to start a game in the stage, during execution of the game program.

In the exemplary embodiment, the processor 81 of the main body apparatus 2 executes the game program stored in the game system 1, thereby executing processes in steps shown in FIG. 16. However, in another embodiment, a part of the processes in the steps may be executed by a processor (e.g., a dedicated circuit or the like) other than the processor 81. If the game system 1 is communicable with another information processing apparatus (e.g., a server), a part of the processes in the steps shown in FIGS. 16 and 17 may be executed by the information processing apparatus. The processes in the steps shown in FIGS. 16 and 17 are merely examples, and the processing order of the steps may be changed or another process may be executed in addition to (or instead of) the process in each step, so long as similar results can be obtained.

Figure 17:
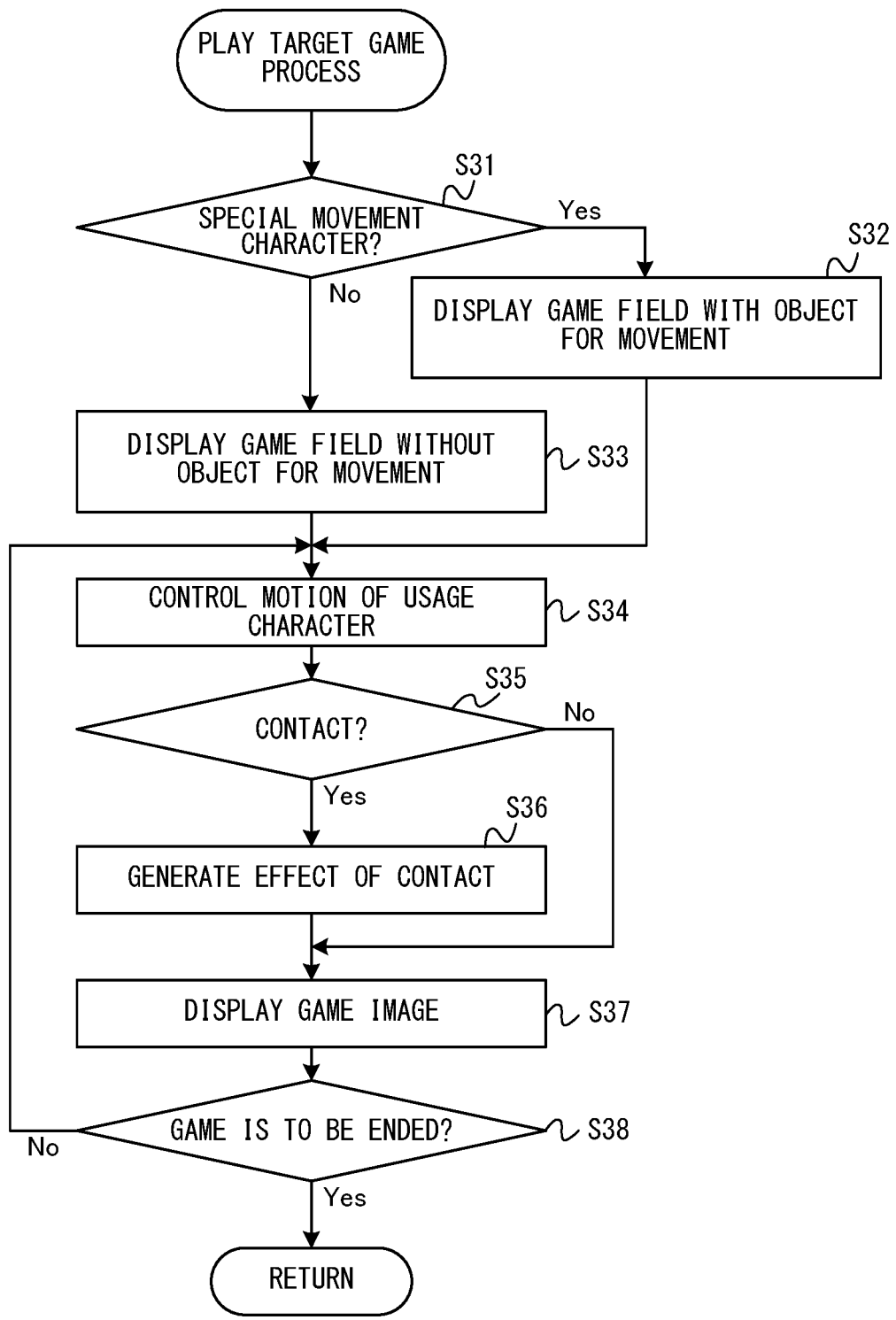
FIG. 17 is a sub-flowchart showing an example of a specific flow of a play target game process in step S10 shown in FIG. 16.

The processor 81 executes the processes in the steps shown in FIGS. 16 and 17 by using a memory (e.g., the DRAM 85). That is, the processor 81 stores, in the memory, information (in other words, data) obtained in each process step, and reads out the information from the memory when using the information in the subsequent process steps.

In step S11 shown in FIG. 16, the processor 81 causes the display device to display the candidate designation image (see FIG. 10). Next to step S1, the process in step S12 is executed.

In step S12, the processor 81 determines whether or not an instruction of designating a candidate character (the aforementioned designation instruction or automatic designation instruction) has been performed by the user. In the exemplary embodiment, the processor 81 determines whether or not various instructions have been performed by the player, based on the operation data acquired from the controller 3 or 4. Here, the processor 81 acquires, at an appropriate timing, the operation data received from each controller via the controller communication section 83 and/or the terminals 17 and 21, and stores the operation data in the memory. The processor 81 performs the above determination, based on the acquired operation data. When the determination result in step S12 is positive, the process in step S13 is executed. When the determination result in step S12 is negative, the process in step S14 is executed.

In step S13, the processor 81 determines a candidate character, based on the instruction performed in step S2. That is, when a designation instruction of designating one character has been performed, the processor 81 determines this character as a candidate character. Meanwhile, when an automatic designation instruction has been performed, the processor 81 determines characters as many as the number of candidates described above from among the plurality of characters prepared (i.e., the characters indicated by the character data), according to the method described in the above "[2-2. Game flow]". At this time, the processor 81 updates the candidate character data stored in the storage medium so as to include data indicating the determined characters. Next to step S13, the process in step S14 is executed.

In step S14, the processor 81 determines whether or not to start the game in the stage. Specifically, the processor 81 determines whether or not the start instruction has been performed (i.e., whether or not an input to the start instruction image 206 has been performed) by the user in the state where the candidate characters as many as the number of candidates have been determined. When the determination result in step S14 is positive, the process in step S15 is executed. When the determination result in step S14 is negative, the process in step S12 is executed again. Thereafter, a series of processes in steps S12 to S14 is repeatedly executed until it is determined to start the game in step S14.

In step S15, the processor 81 determines play target games from among the plurality of mini games prepared (i.e., the plurality of mini games indicated by the mini game data). The play target games are determined according to the method described in the above "[2-2. Game flow]". At this time, the processor 81 updates the stage data stored in the storage medium so as to include the play target game data indicating the determined play target games. Next to step S15, the process in step S16 is executed.

In step S16, the processor 81 determines usage characters to be used in the respective play target games, from among the candidate characters. The usage characters are determined according to the method described in the above "[2-2. Game flow]". At this time, the processor 81 updates the stage data stored in the storage medium so as to include the usage character data indicating the determined usage characters. Next to step S16, the process in step S17 is executed.

In step S17, the processor 81 causes the display device to display the preparation image (see FIG. 11). Next to step S17, the process in step S18 is executed.

In step S18, the processor 81 controls the motion of the usage character displayed in the preparation image, according to an input performed by the user to operate the usage character. That is, the processor 81, based on the operation data stored in the memory, determines inputs to the analog stick and the motion instruction button, and controls the motion of the usage character according to the inputs. The display of the usage character in the preparation image is updated by executing the display process in step S17 after step S18. Next to step S18, the process in step S19 is executed.

In step S19, the processor 81 determines whether or not the preparation period has ended. When the determination result in step S19 is positive, the process in step S20 is executed. When the determination result in step S19 is negative, the process in step S17 is executed again. Thereafter, a series of processes in steps S17 to S19 is repeatedly executed until it is determined in step S19 that the preparation period had ended.

In step S20, the processor 81 executes a play target game process for executing a play target game. Hereinafter, the specific flow of the play target game process will be described with reference to FIG. 17.

FIG. 17 is a sub-flowchart showing an example of the specific flow of the play target game process in step S20 shown in FIG. 16. In the play target game process, firstly, in step S31, the processor 81 determines whether or not the usage character in this play target game is a special movement character. The special movement character is a character (e.g., the character C) of a type that moves by using the aforementioned objects for movement. In the above determination, the processor 81 can specify the usage character in this play target game, based on the usage character data included in the stage data. When the determination result in step S31 is positive, the process in step S32 is executed. When the determination result in step S31 is negative, the process in step S33 is executed.

In step S32, the processor 81 generates, as a game field in the play target game, a game field in which objects for movement are disposed (see FIG. 13), and causes the display device to display a game image indicating the game field. Next to step S32, the process in step S34 is executed.

In step S33, the processor 81 generates, as a game field in the play target game, a game field in which objects for movement are not disposed (see FIG. 12), and causes the display device to display a game image indicating the game field. Next to step S33, the process in step S34 is executed.

In step S34, the processor 81 controls the motion of the usage character displayed in the preparation image, according to an input by the user to operate the usage character. That is, the processor 81 controls the motion of the usage character, in like manner as the process in step S8. When an enemy character and/or a moving object appear in the game field, the processor 81 in step S34 performs a control of causing the enemy character to take a motion and/or a control of moving the object. Next to step S34, the process in step S35 is executed.

In step S35, the processor 81 determines whether or not the usage character or an attack object shot by the usage character has come into contact with a predetermined object in the game field. The predetermined object is an object of a type that generates a game effect when the usage character or the attack object comes into contact with the object (e.g., any of the obstacles 243 to 246 shown in FIG. 14). When the determination result in step S35 is positive, the process in step S36 is executed. When the determination result in step S35 is negative, the process in step S36 is skipped and the process in step S37 is executed.

In step S36, the processor 81 generates an effect due to the contact determined in step S35. For example, when the object is any of the obstacles 243 to 246, the processor 81 destroys the obstacle as the above effect. Alternatively, when the object is an item that the usage character can acquire, the processor 81 causes the usage character to acquire the item, as the above effect. Moreover, for example, when the object is the above object for movement and the attack object comes into contact with the object for movement, the processor 81 moves the usage character to the position of the object for movement. Next to step S36, the process in step S37 is executed.

In step S37, the processor 81 generates a game image (see FIGS. 12 to 14) in the play target game, and causes the display device to display the game image. When a series of processes in steps S34 to S38 is repeatedly executed, the process of generating the game image in step S37 is executed once every predetermined time (e.g., 1 frame time). Thus, the game image indicating the state where the usage character and the like move in the game field, is displayed. Next to step S37, the process in step S38 is executed.

In step S38, the processor 81 determines whether or not to end the play target game. Specifically, the processor 81 ends the play target game when the execution time of the play target game has reached the time limit, or when the usage character has satisfied the clear condition or the game is over before the time limit expires. In step S38, the processor 81 determines whether the play target game has been cleared or not. That is, when the usage character has satisfied the clear condition, the processor 81 determines that the game has been cleared, whereas, when the usage character has ended up game over, the processor 81 determines that the game has not been cleared. When the execution time of the play target game has reached the time limit, the play target game is determined as "cleared" in some cases while it is determined as "not cleared" in other cases, depending on the content of the play target game. When the determination result in step S38 is negative, the process in step S34 is executed again. Thereafter, a series of processes in steps S34 to S38 is repeatedly executed until the play target game is determined to be ended in step S38. When the determination result in step S38 is positive, the processor 81 ends the play target game process shown in FIG. 17.

Referring back to FIG. 16, in step S21 next to step S20, the processor 81 determines whether or not to end the stage being executed. Specifically, the processor 81 determines whether or not all the play target games included in this stage have ended. Moreover, the processor 81 determines whether or not a predetermined clear failure condition has been satisfied. As an example, a stage is started with a predetermined number of lives being held, the number of the lives decreases each time a play target game has failed to be cleared, and it is determined that the clear failure condition is satisfied when all the lives are lost. When execution of all the play target games included in this stage has ended or when the predetermined clear failure condition has been satisfied, the processor 81 determines to end the stage being executed. Meanwhile, when not all the play target games included in this stage are ended and the predetermined clear failure condition is not satisfied, the processor 81 determines not to end the stage being executed. When the determination result in step S21 is negative, the process in step S17 is executed again. Thereafter, a series of processes in steps S17 to S21 is executed until it is determined in step S21 to end the stage. In step S17 to be executed after step S21, a preparation image regarding a play target game to be executed next to the play target game having been executed in the immediately preceding step S20, is displayed. Meanwhile, when the determination result in step S21 is positive, the processor 81 ends the stage processing shown in FIG. 16.

[4. Function and Effect of Exemplary Embodiment, and Modifications]

As described above, in the above exemplary embodiment, the game program causes a computer (e.g., the processor 81) of an information processing apparatus to perform operations as follows:

Automatically determining at least one play target game to be played by a player, from among a plurality of types of games (step S15).

Automatically determining a usage character to be operated by the player, from among a plurality of characters whose operation methods are different from each other (step S16).

Executing the at least one play target game by controlling the determined usage character in a virtual space, based on an operation performed by the player, and advancing the game based on whether or not a clear condition for the at least one play target game has been satisfied within a time limit (step S20).

According to the above configuration, it is possible to provide many variations of games by combining play target games and usage characters. For example, as for a play target game that the player has once played, when the player plays the play target game again by using a usage character different from one used in the previous play, the strategic method for clearing the game and the fun factor are different from those in the previous play, so that the player can play the game without losing interest. Moreover, since the time limit is set on each play target game, it is possible to provide the player with a new fun factor, that is, clearing the game by grasping the operation method for the usage character as quickly as possible.

The phrase "advancing the game" means not only "advancing the game of one stage by successively performing a plurality of play target games" as in the exemplary embodiment, but also "finishing one play target game". That is, the phrase "advancing the game" means both "finishing a play target game and starting a next play target game" and "finishing a play target game".

In the exemplary embodiment, the case where a game is performed in units of stages each including a plurality of play target games, has been described. In another embodiment, the game system 1 may execute a game with a play target game as a unit. That is, when the game system 1 has executed one play target game in response to a game start instruction performed by the user, the game system 1 may not necessarily execute a next play target game successively after the end of play target game.

(Modification Related to the Number of Players)

In the exemplary embodiment, the case where one player plays play target games has been described. However, the number of players playing play target games is arbitrary, and may be two or more. When a plurality of players play one play target game, the game system 1 may determine a usage character for each player, or may determine one usage character common to the players. In another embodiment, one stage may be played by a plurality of players. For example, the game system 1 may advance a plurality of play target games in one stage by allowing a certain player to play one play target game and allowing another player to play a next play target game.

(Modification Related to Combination of Play Target Games and Usage Characters)

In the exemplary embodiment, the case where all the usage characters are available in the respective play target games has been described. In a modification of the exemplary embodiment, a specific character may not necessarily be used in a specific play target game. That is, when the game system 1 has determined the specific play target game, the game system 1 may not necessarily determine the specific character as a usage character. Also in this modification, if a plurality of types of characters can be used as usage characters in one play target game, the variations of game contents can be increased as in the exemplary embodiment.

In another embodiment, the information processing system may not necessarily include a part of the components included in the exemplary embodiment, and may not necessarily perform a part of the processes performed in the exemplary embodiment. For example, in order to achieve a certain specific effect of the exemplary embodiment, the information processing system may include a component for producing the effect and perform a process for producing the effect, in other words, the information processing system may not necessarily include components other than the component and may not necessarily perform processes other than the process.

The exemplary embodiment is usable as, for example, a game system, a game program, and the like for the purpose of increasing the variations of game contents.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program,
   the game program causing a processor of an information processing apparatus to execute:
   automatically determining a play target game to be played by a player, from among a plurality of types of games;
   automatically determining a usage character to be operated by the player, from among a plurality of characters whose operation methods are different from each other, where the usage character is randomly determined from among the plurality of characters, and where the plurality of characters from which the usage character is randomly determined is designated in advance based on an instruction of the player; and
   executing the play target game by controlling the determined usage character in a virtual space, based on an operation performed by the player, and advancing the game based on whether or not a clear condition for the play target game has been satisfied within a time limit.

2. The storage medium according to claim 1, wherein
   the game program causes the processor to execute:
   automatically determining a plurality of play target games;
   automatically determining a plurality of usage characters to be operated by the player in the plurality of play target games determined, respectively; and
   successively executing the plurality of play target games determined, thereby advancing a game including the plurality of play target games.

3. The storage medium according to claim 1, wherein
   the plurality of characters are different from each other in a movement method according to a direction input and a predetermined instruction input different from the direction input, and
   the game program causes the processor to further execute performing, during execution of the play target game, a movement control for the usage character in the virtual space, according to a movement method corresponding to the usage character, based on the direction input and the predetermined instruction input.

4. The storage medium according to claim 3, wherein
   the game program causes the processor to execute performing, as a movement control for at least any of the plurality of characters, a movement control by using at least any of: a method of moving the usage character in a direction according to the direction input; a method of moving the usage character in a predetermined direction according to a combination of the direction input and the predetermined instruction input; and a method of automatically moving the usage character.

5. The storage medium according to claim 3, wherein
   the game program causes the processor to further execute performing, as a control for an attack motion of at least any of the plurality of characters, a control for an attack motion of shooting an attack object automatically or according to the predetermined instruction input.

6. The storage medium according to claim 5, wherein
   the game program causes the processor to further execute:
   performing, for each of the plurality of characters, a control of causing a predetermined object in the virtual space to generate a predetermined effect when the character has come into contact with the predetermined object; and
   performing, for a character that shoots the attack object among the plurality of characters, a control of causing the predetermined object to generate an effect when the attack object has come into contact with the predetermined object, the effect being the same as the effect generated when the character has come into contact with the predetermined object.

7. The storage medium according to claim 5, wherein
   the game program causes the processor to execute, when the determined usage character is a predetermined character that shoots the attack object, starting the play target game by using the virtual space in which an object for movement is disposed, and performing a movement control for moving the predetermined character toward the object for movement when the attack object has come into contact with the object for movement.

8. The storage medium according to claim 3, wherein
   the plurality of characters include a character of a first type that is influenced by gravity in the virtual space, and a character of a second type that is not influenced by gravity in the virtual space, and
   the game program causes the processor to execute, when the usage character is the character of the first type, performing a movement control for the usage character with an influence of gravity being reflected during execution of the play target game.

9. The storage medium according to claim 1, wherein
the game program causes the processor to further execute presenting, to the player, information regarding the determined play target game and the usage character, within a predetermined time period before the determined play target game is started.

10. The storage medium according to claim 9, wherein the game program causes the processor to further execute, within the predetermined time period, presenting, to the player, an operation method for the determined usage character, and controlling the usage character, based on an operation by the player.

11. The storage medium according to claim 1, wherein the time limit is a time period, having a predetermined time length within 5 seconds, which is set for each of the plurality of types of games.

12. An information processing system including one or more processors, the one or more processors cause the information processing system to:
automatically determine a play target game to be played by a player, from among a plurality of types of games;
automatically determine a usage character to be operated by the player, from among a plurality of characters whose operation methods are different from each other, where the usage character is randomly determined from among the plurality of characters, and where the plurality of characters from which the usage character is randomly determined is designated in advance based on an instruction of the player; and
execute the play target game by controlling the determined usage character in a virtual space, based on an operation performed by the player, and advance the game based on whether or not a clear condition for the play target game has been satisfied within a time limit.

13. The information processing system according to claim 12, wherein the one or more processors cause the information processing system to,
automatically determine a plurality of play target games,
automatically determine a plurality of usage characters to be operated by the player in the plurality of play target games determined, respectively and
successively execute the plurality of play target games determined, thereby advancing a game including the plurality of play target games.

14. The information processing system according to claim 12, wherein
the plurality of characters are different from each other in a movement method according to a direction input and a predetermined instruction input different from the direction input, and
the information processing system, during execution of the play target game, performs a movement control for the usage character in the virtual space, according to a movement method corresponding to the usage character, based on the direction input and the predetermined instruction input.

15. The information processing system according to claim 14, wherein the one or more processing cause the information processing system to perform, as a movement control for at least any of the plurality of characters, a movement control by using at least any of: a method of moving the usage character in a direction according to the direction input; a method of moving the usage character in a predetermined direction according to a combination of the direction input and the predetermined instruction input; and a method of automatically moving the usage character.

16. The information processing system according to claim 14, wherein the one or more processors cause the information processing system to perform, as a control for an attack motion of at least any of the plurality of characters, a control for an attack motion of shooting an attack object automatically or according to the predetermined instruction input.

17. The information processing system according to claim 16, wherein the one or more processors cause the information processing system to
perform, for each of the plurality of characters, a control of causing a predetermined object in the virtual space to generate a predetermined effect when the character has come into contact with the predetermined object, and
perform, for a character that shoots the attack object among the plurality of characters, a control of causing the predetermined object to generate an effect when the attack object has come into contact with the predetermined object, the effect being the same as the effect generated when the character has come into contact with the predetermined object.

18. The information processing system according to claim 16, wherein the information processing system,
when the determined usage character is a predetermined character that shoots the attack object, starts the play target game by using the virtual space in which an object for movement is disposed, and performs a movement control for moving the predetermined character toward the object for movement when the attack object has come into contact with the object for movement.

19. The information processing system according to claim 14, wherein
the plurality of characters include a character of a first type that is influenced by gravity in the virtual space, and a character of a second type that is not influenced by gravity in the virtual space, and
the information processing system, when the usage character is the character of the first type, performs a movement control for the usage character with an influence of gravity being reflected during execution of the play target game.

20. The information processing system according to claim 12, wherein the one or more processors cause the information processing system to present, to the player, information regarding the determined play target game and the usage character, within a predetermined time period before the determined play target game is started.

21. The information processing system according to claim 20, wherein the one or more processors cause the information processing system to, within the predetermined time period, present, to the player, an operation method for the determined usage character, and control the usage character, based on an operation by the player.

22. The information processing system according to claim 12, wherein the time limit is a time period, having a predetermined time length within 5 seconds, which is set for each of the plurality of types of games.

23. An information processing apparatus including one or more processors,
one or more processors cause the information processing apparatus to:
automatically determine a play target game to be played by a player, from among a plurality of types of games;
automatically determine a usage character to be operated by the player, from among a plurality of characters whose operation methods are different from each other, where the usage character is randomly determined from among the plurality of characters, and where the plurality of characters from which the usage character is randomly determined is designated in advance based on an instruction of the player; and execute the play target game by controlling the determined usage character in a virtual space, based on an operation performed by the player, and advance the game based on whether or not a clear condition for the play target game has been satisfied within a time limit.

24. The information processing apparatus according to claim 23, wherein the one or more processors cause the information processing apparatus to automatically determine a plurality of play target games, automatically determine a plurality of usage characters to be operated by the player in the plurality of play target games determined, respectively, and successively execute the plurality of play target games determined, thereby advancing a game including the plurality of play target games.

25. A game processing method executed by an information processing system, comprising:

automatically determining a play target game to be played by a player, from among a plurality of types of games;

automatically determining a usage character to be operated by the player, from among a plurality of characters whose operation methods are different from each other, where the usage character is randomly determined from among the plurality of characters, and where the plurality of characters from which the usage character is randomly determined is designated in advance based on an instruction of the player; and executing the play target game by controlling the determined usage character in a virtual space, based on an operation performed by the player, and advancing the game based on whether or not a clear condition for the play target game has been satisfied within a time limit.

26. The game processing method according to claim 25, wherein a plurality of play target games are automatically determined, a plurality of usage characters to be operated by the player in the plurality of play target games determined, respectively, are automatically determined, and the plurality of play target games determined are successively executed, thereby advancing a game including the plurality of play target games.

27. A non-transitory computer-readable storage medium having stored therein a game program, the game program causing a processor of an information processing apparatus to execute:

automatically determining a play target game to be played by a player, from among a plurality of types of games;

automatically determining a usage character to be operated by the player, from among a plurality of characters whose operation methods are different from each other;

presenting, within a predetermined time period before the determined play target game is started, information indicating a mapping between an input by the player and a motion that the usage character performs when the input is provided by the player; and executing the play target game by controlling the determined usage character in a virtual space, based on an operation performed by the player, and advancing the game based on whether or not a clear condition for the play target game has been satisfied within a time limit.

28. An information processing system including one or more processors, the one or more processors cause the information processing system to:

automatically determine a play target game to be played by a player, from among a plurality of types of games;

automatically determine a usage character to be operated by the player, from among a plurality of characters whose operation methods are different from each other;

present, within a predetermined time period before the determined play target game is started, information indicating a mapping between an input by the player and a motion that the usage character performs when the input is provided by the player; and execute the play target game by controlling the determined usage character in a virtual space, based on an operation performed by the player, and advance the game based on whether or not a clear condition for the play target game has been satisfied within a time limit.

29. An information processing apparatus including one or more processors, the one or more processors cause the information processing apparatus to:

automatically determine a play target game to be played by a player, from among a plurality of types of games;

automatically determine a usage character to be operated by the player, from among a plurality of characters whose operation methods are different from each other;

present, within a predetermined time period before the determined play target game is started, information indicating a mapping between an input by the player and a motion that the usage character performs when the input is provided by the player; and execute the play target game by controlling the determined usage character in a virtual space, based on an operation performed by the player, and advance the game based on whether or not a clear condition for the play target game has been satisfied within a time limit.

30. A game processing method executed by an information processing system, comprising:

automatically determining a play target game to be played by a player, from among a plurality of types of games;

automatically determining a usage character to be operated by the player, from among a plurality of characters whose operation methods are different from each other;

presenting, within a predetermined time period before the determined play target game is started, information indicating a mapping between an input by the player and a motion that the usage character performs when the input is provided by the player; and executing the play target game by controlling the determined usage character in a virtual space, based on an operation performed by the player, and advancing the game based on whether or not a clear condition for the play target game has been satisfied within a time limit.

31. A non-transitory computer-readable storage medium having stored therein a game program, the game program causing a processor of an information processing apparatus to execute:

automatically determining a play target game to be played by a player, from among a plurality of types of games;

automatically determining a usage character to be operated by the player, from among a plurality of characters whose operation methods are different from each other and the plurality of characters are different from each other in a movement method according to a direction input and a predetermined instruction input different from the direction input;

executing the play target game by controlling the determined usage character in a virtual space, based on an operation performed by the player and performing a movement control for the determined usage character in the virtual space, according to a movement method corresponding to the determined usage character, based on the direction input and the predetermined instruction input and advancing the game based on whether or not a clear condition for the play target game has been satisfied within a time limit;

performing, as a control for an attack motion of at least any of the plurality of characters, a control for an attack motion of shooting an attack object automatically or according to the predetermined instruction input;

performing, for each of the plurality of characters, a control of causing a predetermined object in the virtual space to generate a predetermined effect when the character has come into contact with the predetermined object; and performing, for a character that shoots the attack object among the plurality of characters, a control of causing the predetermined object to generate an effect when the attack object has come into contact with the predetermined object, the effect being the same as the effect generated when the character has come into contact with the predetermined object.

32. An information processing system including one or more processors, the one or more processors cause the information processing system:

automatically determine a play target game to be played by a player, from among a plurality of types of games;

automatically determine a usage character to be operated by the player, from among a plurality of characters whose operation methods are different from each other and the plurality of characters are different from each other in a movement method according to a direction input and a predetermined instruction input different from the direction input;

execute the play target game by controlling the determined usage character in a virtual space, based on an operation performed by the player and perform a movement control for the determined usage character in the virtual space, according to a movement method corresponding to the determined usage character, based on the direction input and the predetermined instruction input and advance the game based on whether or not a clear condition for the play target game has been satisfied within a time limit;

perform, as a control for an attack motion of at least any of the plurality of characters, a control for an attack motion of shooting an attack object automatically or according to the predetermined instruction input;

perform, for each of the plurality of characters, a control of causing a predetermined object in the virtual space to generate a predetermined effect when the character has come into contact with the predetermined object; and perform, for a character that shoots the attack object among the plurality of characters, a control of causing the predetermined object to generate an effect when the attack object has come into contact with the predetermined object, the effect being the same as the effect generated when the character has come into contact with the predetermined object.

33. An information processing apparatus including one or more processors, the one or more processors cause the information processing apparatus to:

automatically determine a play target game to be played by a player, from among a plurality of types of games;

automatically determine a usage character to be operated by the player, from among a plurality of characters whose operation methods are different from each other and the plurality of characters are different from each other in a movement method according to a direction input and a predetermined instruction input different from the direction input;

execute the play target game by controlling the determined usage character in a virtual space, based on an operation performed by the player and perform a movement control for the determined usage character in the virtual space, according to a movement method corresponding to the determined usage character, based on the direction input and the predetermined instruction input and advance the game based on whether or not a clear condition for the play target game has been satisfied within a time limit;

perform, as a control for an attack motion of at least any of the plurality of characters, a control for an attack motion of shooting an attack object automatically or according to the predetermined instruction input;

perform, for each of the plurality of characters, a control of causing a predetermined object in the virtual space to generate a predetermined effect when the character has come into contact with the predetermined object; and perform, for a character that shoots the attack object among the plurality of characters, a control of causing the predetermined object to generate an effect when the attack object has come into contact with the predetermined object, the effect being the same as the effect generated when the character has come into contact with the predetermined object.

34. A game processing method executed by an information processing system, comprising:

automatically determining a play target game to be played by a player, from among a plurality of types of games;

automatically determining a usage character to be operated by the player, from among a plurality of characters whose operation methods are different from each other and the plurality of characters are different from each other in a movement method according to a direction input and a predetermined instruction input different from the direction input;

executing the play target game by controlling the determined usage character in a virtual space, based on an operation performed by the player and performing a movement control for the determined usage character in the virtual space, according to a movement method corresponding to the determined usage character, based on the direction input and the predetermined instruction input and advancing the game based on whether or not a clear condition for the play target game has been satisfied within a time limit;

performing, as a control for an attack motion of at least any of the plurality of characters, a control for an attack motion of shooting an attack object automatically or according to the predetermined instruction input;

performing, for each of the plurality of characters, a control of causing a predetermined object in the virtual space to generate a predetermined effect when the character has come into contact with the predetermined object; and performing, for a character that shoots the attack object among the plurality of characters, a control of causing the predetermined object to generate an effect when the attack object has come into contact with the predetermined object, the effect being the same as the effect generated when the character has come into contact with the predetermined object.

\* \* \* \* \*